(12) United States Patent
Sudoh

(10) Patent No.: US 6,549,923 B1
(45) Date of Patent: Apr. 15, 2003

(54) DIFFERENTIATION LEARNING AIDING APPARATUS AND STORAGE MEDIUM

(75) Inventor: Tomohiro Sudoh, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/436,859

(22) Filed: Nov. 9, 1999

(30) Foreign Application Priority Data

Nov. 19, 1998 (JP) ............................................ 10-329604

(51) Int. Cl.$^7$ ................................................. G06F 3/00
(52) U.S. Cl. ...................................................... 708/162
(58) Field of Search ................................ 708/130, 160, 708/162, 443; 345/440

(56) References Cited

U.S. PATENT DOCUMENTS

| | | | | |
|---|---|---|---|---|
| 5,210,708 A | * | 5/1993 | Negishi ...................... | 408/174 |
| 5,303,338 A | * | 4/1994 | Handa et al. ................ | 345/440 |
| 5,535,317 A | * | 7/1996 | Tanaka et al. .............. | 345/440 |
| 5,739,823 A | * | 4/1998 | Akaza et al. ................ | 345/440 |
| 5,907,317 A | * | 5/1999 | Tanaka et al. .............. | 345/593 |
| 6,133,924 A | * | 10/2000 | Ito et al. ..................... | 345/440 |

* cited by examiner

Primary Examiner—Chuong Dinh Ngo
(74) Attorney, Agent, or Firm—Frishauf, Holtz, Goodman & Chick, P.C.

(57) ABSTRACT

A function $f(x)$ input to an input device is differentiated to provide a derivative $f'(x)$ and the derivative is further differentiated to provide a second derivative $f''(x)$ in accordance with a predetermined program stored in a ROM or memory device. Data of an increase-decrease table for the function $f(x)$ is produced based on positive and negative signs of values of the $f'(x)$ and $f''(x)$ in a given domain, and then stored in RAM. Then, the table is displayed on a display device based on the table data.

10 Claims, 26 Drawing Sheets

FIG.6A
f(x) = 3X^3 - 9X - 2
f'(x) = 9X^2 - 9
f''(x) = 18X
| x | | -1 | | 0 | | 1 | |
|---|---|---|---|---|---|---|---|
| f(x) | ↗ | 2 | ↘ | -2 | ↘ | -8 | ↗ |
| f'(x) | + | 0 | − | -9 | − | 0 | + |
| f''(x) | − | -18 | − | 0 | + | 18 | + |
FIG.6B
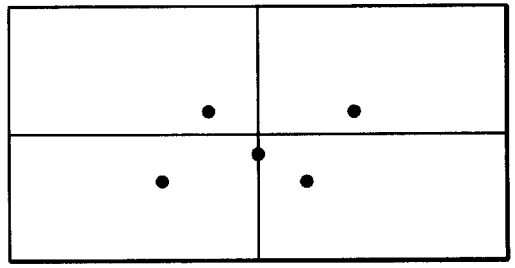
FIG.6C
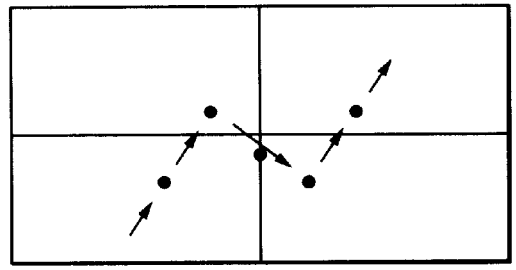
FIG.6D
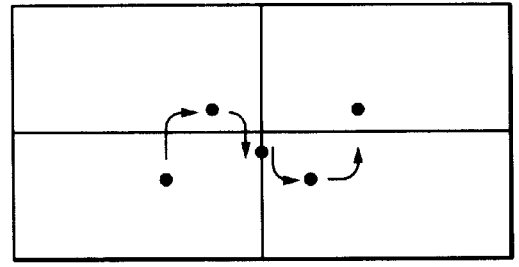
FIG.6E
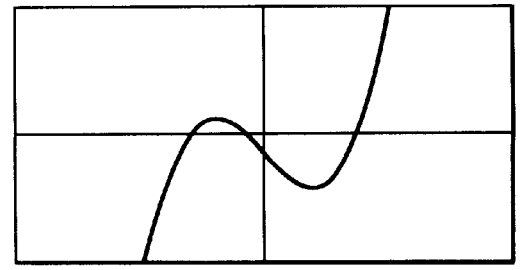

FIG.8A
f(x) = 3X^3 - 9X - 2
f'(x) = 9X^2 - 9
f''(x) = 18X
| x | | -1 | | 0 | | 1 | |
|---|---|---|---|---|---|---|---|
| f(x) | ⤴ | 2 | ⤵ | -2 | ⤵ | -8 | ⤴ |
| f'(x) | + | 0 | − | -9 | − | 0 | + |
| f''(x) | − | -18 | − | 0 | + | 18 | + |
FIG.8B
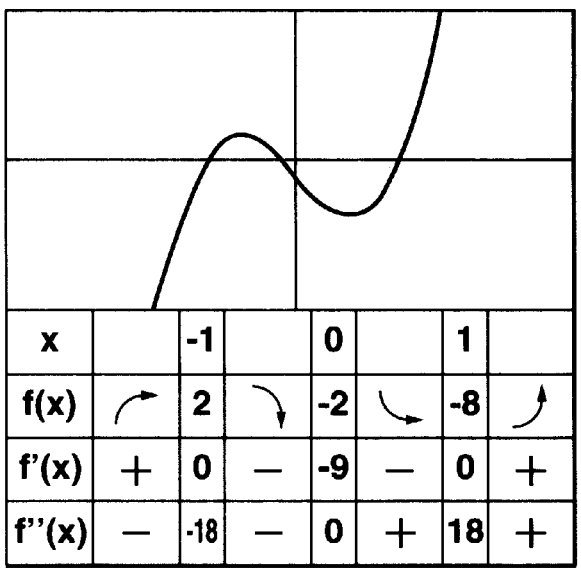
| x | | -1 | | 0 | | 1 | |
|---|---|---|---|---|---|---|---|
| f(x) | ⤴ | 2 | ⤵ | -2 | ⤵ | -8 | ⤴ |
| f'(x) | + | 0 | − | -9 | − | 0 | + |
| f''(x) | − | -18 | − | 0 | + | 18 | + |
FIG.8C
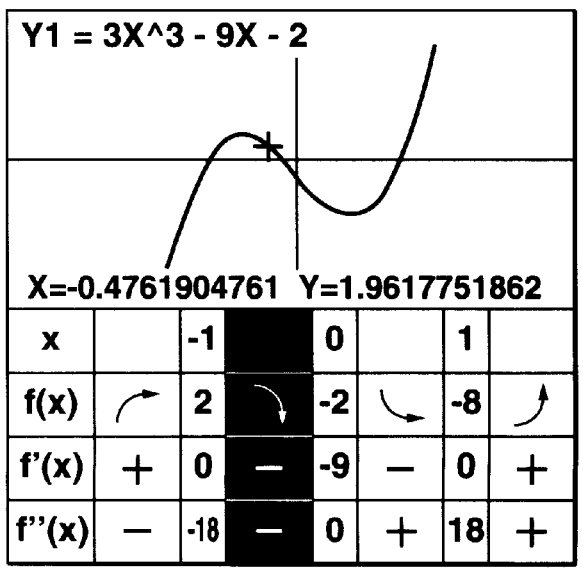
Y1 = 3X^3 - 9X - 2
X=-0.4761904761   Y=1.9617751862
| x | | -1 | | 0 | | 1 | |
|---|---|---|---|---|---|---|---|
| f(x) | ⤴ | 2 | ⤵ | -2 | ⤵ | -8 | ⤴ |
| f'(x) | + | 0 | − | -9 | − | 0 | + |
| f''(x) | − | -18 | − | 0 | + | 18 | + |

$f(x) = 3x^3 - 9x - 2$ $f(x) = 3x^3 - 9x - 2$ $f'(x) = 9x^2 - 9$
$f''(x) = 18x$

| x | | -1 | | 0 | | 1 | |
|---|---|---|---|---|---|---|---|
| f(x) | ↗ | 2 | ↘ | -2 | ↘ | -8 | ↗ |
| f'(x) | + | 0 | − | -9 | − | 0 | + |
| f''(x) | − | -18 | − | 0 | + | 18 | + |

| x | -1/2 | | 0 | | 1/2 |
|---|------|---|---|---|-----|
| f(x) | 9/8 | + | -2 | + | 5/8 |
| f'(x) | | + | 0 | − | |
| f"(x) | | − | -2 | − | | f(x) = X^3 - 3X^2 + 2 > 0
1 / 2 > X > -1 / 2

TRUE

FIG.18

| DIMENSION CONTRAST TABLE | | |
|---|---|---|
| UNIT NAME | UNIT | DIMENSION |
| distance | m | L |
| velocity | m/s | $LT^{-1}$ |
| accelaration | m/s² | $LT^{-2}$ |
| ........ | ........ | ........ |

FIG.19A

INPUT      6t [m/s]

dimension : $LT^{-1}$

FIG.19B

INPUT      6X [m/s]

dimension : $LT^{-1}$ $\frac{d}{dt} 6t = 6 [m/s^2]$ dimension : $LT^{-2}$

Q1 : f(x) = X^3 + 2X
f'(x) = AX^B + C
  A = 3  : GOOD
  B = 2  : GOOD
  C = 1  : C = 2

| n | X^8 | | 5X^7 | |
|---|---|---|---|---|
| | COEFFI-CIENT | DEGREE | COEFFI-CIENT | DEGREE |
| 1 | 1 | 8 | 5 | 7 |
| 2 | 8 | 7 | 35 | 6 |
| 3 | 56 | 6 | 210 | 5 |
| 4 | . | . | . | . |
| 5 | . | . | . | . |
| | . | . | . | . |

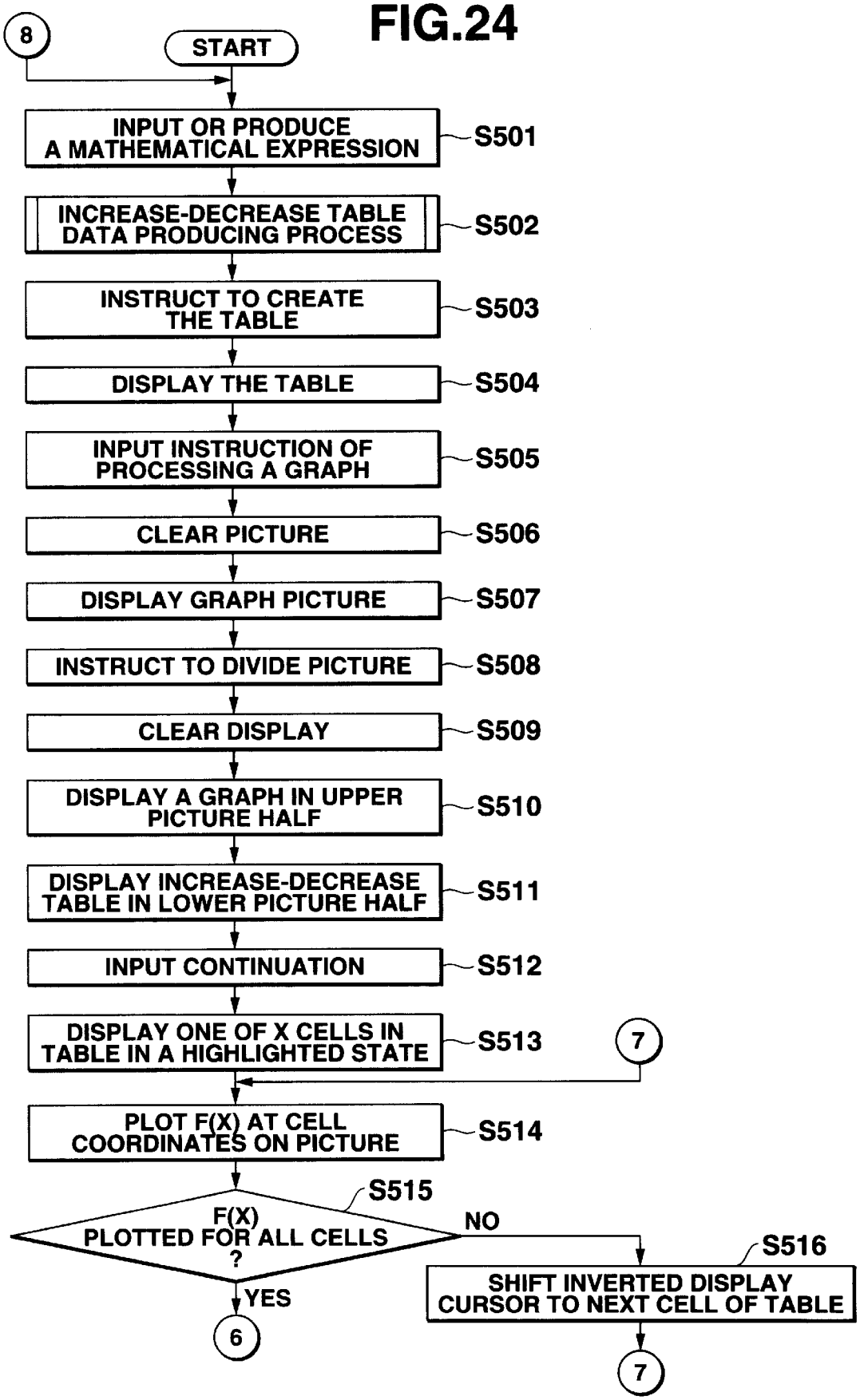

DIFFERENTIATION LEARNING AIDING APPARATUS AND STORAGE MEDIUM

BACKGROUND OF THE INVENTION

1. Field of the Invention

The present invention relates to electronic apparatus having the function of displaying graphs and more particularly to a differentiation learning aiding apparatus with the function of displaying a graph, and a storage medium which contains a control program therefor.

2. Description of the Related Art

Recently, there are electronic calculating apparatus such as pocket or desk-top calculators which perform calculation utilizing a function, input a function expression per se, and display a graph of the inputted function.

When differentiation and/or calculation of a derived function are performed by such electronic calculating apparatus, it outputs a result of the calculation as a numerical value and further displays a graph of the derived function. However, it cannot display an increase-decrease table useful for displaying a graph.

Therefore, in learning, a learner must learn an increase-decrease table before understanding a graph. Thus, the learner must draw an increase-decrease table by hand for learning, which is very inefficient compared to displaying the graph.

SUMMARY OF THE INVENTION

The object of the present invention is to provide an electronic apparatus capable of displaying an increase-decrease table in the learning of differentiation.

(1) In order to solve the above mentioned problem, according to one aspect of the present invention, there is provided an electronic apparatus comprising:

function-setting means for setting a function;

first-order differentiating means for differentiating the function set by the function setting means to provide a first-derivative;

increase-decrease table data producing means for producing increase-decrease table data for displaying an increase-decrease table which contains an increase-decrease state of the function set by the function setting means, and positive and negative signs of values of the first-derivative function obtained by the first-order differentiating means, in predetermined domains; and displaying means for displaying the increase-decrease table on the basis of the increase-decrease table data produced by the increase-decrease table data producing means.

According to this invention, the function is set by the function setting means. The set function is differentiated by the first-order differentiating means to provide a first derivative. The increase-decrease table data producing means produces the increase-decrease table data for displaying the increase-decrease table which contains the increase-decrease state of the function set by the function setting means, and the positive and negative signs of values of the first-derivative provided by the first-derivative differentiating means, in the predetermined domains. The increase-decrease table is then displayed on the displaying means on the basis of the increase-decrease table data produced by the increase-decrease table data producing means.

(2) The apparatus may further comprise second-order differentiating means for obtaining a second derivative of the function by further differentiating the first-derivative provided by the first-derivative differentiating means. The increase-decrease table data producing means may produce the increase-decrease table data for displaying the increase-decrease table which contains in the predetermined domain the increase-decrease state of the function set by the function setting means, positive and negative signs of values of the first-derivative obtained by the first-order differentiating means, and positive and negative signs of values of the second derivative obtained by the second-order differentiating means.

According to this invention, the second-order differentiating means further differentiates the first-derivative obtained by the first-order differentiating means to provide the second-derivative. As described above, the increase-decrease table data producing means may produce increase-decrease table data for displaying the increase-decrease table which contains in a predetermined domain an increase-decrease state of the function set by the function setting means, positive and negative signs of values of the first-derivative obtained by the first-order differentiating means, and positive and negative signs of values of the second derivative obtained by the second-order differentiating means.

Therefore, since the second derivative is obtained, and the increase-decrease table containing the first and second derivatives is displayed, the learner can understand not only increases and decreases in a graph of the original function which is indicated by the positive and negative signs of values of the first derivative, but also a form of the graph of the original function upward and downward convex which is indicated by the positive and negative signs of values of the second derivative. Therefore, the learner can easily produce a precise graph with a reduced quantity of handwork, thereby achieving a high learning effect and an effective learning of the graph of the function and differentiation.

(3) According to the present invention, the apparatus may further comprises:

display controlling means for controlling the displaying means to displaying the increase-decrease table in a state where a portion of the increase-decrease table data is hidden, when the increase-decrease table is displayed by the displaying means on the basis of the increase-decrease table data produced by the increase-decrease table data producing means, increase-decrease table data inputting means for inputting data to the hidden data portion of the increase-decrease table displayed by the displaying means under control of the display controlling means; and increase-decrease table data determining means for determining whether or not the data inputted by the increase-decrease table data inputting means coincides with the hidden data portion of the increase-decrease table data produced by the increase-decrease table data producing means to output a result of the determination.

According to this invention, the display controlling means controls the displaying means so as to display the increase-decrease table in the state where the portion of the increase-decrease table data is hidden, when the increase-decrease table is displayed by the displaying means on the basis of the increase-decrease table data produced by the increase-decrease table data producing means. The increase-decrease table data inputting means inputs the data to the hidden data portion of the increase-decrease table displayed by the displaying means under control of the display controlling means. The increase-decrease table data determining means determines whether or not the data inputted by the increase-decrease table data inputting means coincides with the hidden data portion of the increase-decrease table data produced by the increase-decrease table data producing means to output a result of the determination.

Therefore, when the increase-decrease table is displayed by the displaying means, the portion of data is displayed in the hidden state. When the hidden data is inputted, the determining means determines whether the inputted data is proper or not and displays the result of the determination. Thus, the learner can efficiently learn drawing the increase-decrease table. In this case, no trouble to draw the entire increase-decrease table by hand is required to be taken to reduce the learner's work. Moreover, when only the portion of data of the increase-decrease table is hidden, the learner can learn while viewing other displayed data, which is useful especially for elementary learning.

(4) The increase-decrease table data producing means may produce the decrease-decrease table data for displaying the increase-decrease table which represents the increase-decrease state of the function set by the function setting means, in two kinds of increase states and two kinds of decrease states in the predetermined domains, on the basis of the positive and negative signs of values of the first and second derivatives in the predetermined domains.

Therefore, when the increase-decrease table of the function is displayed, the increase-decrease state of the function is displayed in four states, that is, clockwise-curved rightward and downward states and counterclockwise-curved rightward and upward states on the basis of the positive and negative signs of values of the first and second derivatives in the predetermined domain. Therefore, the learner can easily image a precise graph efficiently. Further, since the increase-decrease table similar to that which the learner draws by hand is displayed, the learner can also learn how to draw the increase-decrease table.

(5) The apparatus may further comprise graphic data producing means for producing graphic data for displaying a graph of the function set by the function setting means on the basis of the increase-decrease table data produced by the increase-decrease table data producing means. The displaying means may display the graph in a predetermined display form on the basis of the graphic data produced by the graphic data producing means.

Therefore, since the increase-decrease table and the graph are displayed by the displaying means when the learner learns the table, the learner can learn the relationship between the increase-decrease table of the function and the graph without any troublesome handwork to draw the graph, thereby reducing the learner's load in the learning to enable the learner to learn even a complex function easily.

(6) The displaying means may display the increase-decrease table and the graph simultaneously on the basis of the increase-decrease table data produced by the increase-decrease table data producing means and the graphic data produced by the graphic data producing means. The apparatus may further comprise:
  graph position specifying means for specifying a particular position on the graph displayed by the displaying means;
  domain detecting means for detecting a domain corresponding to the position designated by the graph position designating means; and
  emphatic display controlling means for controlling the displaying means to emphatically display a portion of the increase-decrease table displayed by the displaying means corresponding to the domain detected by the domain detecting means.

According to this invention, as described above, the displaying means may display the increase-decrease table and the graph simultaneously on the basis of the increase-decrease table data produced by the increase-decrease table data producing means and the graphic data produced by the graphic data producing means. The graph position designating means designates a particular position on the graph displayed by the displaying means. The domain detecting means detects the domain corresponding to the particular position specified by the graph position designating means. The emphatic display controlling means controls the displaying means to indicate the portion of the increase-decrease table displayed by the displaying means corresponding to the domain detected by the domain detecting means.

Therefore, since the increase-decrease table of the function and its graph are simultaneously displayed, the learner can easily learn them and clearly observe the relationship between the increase-decrease table of the function and its graph, which results in a high learning effect. Moreover, since a particular position on the graph is emphatically displayed, and further the emphatically displayed domain is also emphatically displayed in the increase-decrease table, the learner can easily observe the relationship between the increase-decrease table and the graph to produce a higher learning effect.

(7) According to this invention, the apparatus may further comprise:
  higher-order differentiating means for obtaining a higher-order derivative by differentiating the second derivative obtained by the second-order differentiating means a required numbers of times, and for sequentially outputting the higher-order derivative obtained by the respective differentiating means; and
  graphic display controlling means for controlling the displaying means to display graphs of the first derivative obtained by the first-order differentiating means, the second derivative obtained by the second-order differentiating means, and the higher-order derivatives obtained sequentially by the higher-order differentiating means.

According to this invention, the higher-order differentiating means obtains a higher-order derivative by differentiating the second derivative obtained by the second-order differentiating means a required number of times, and sequentially outputs higher-order derivatives obtained by the respective differentiating means. The graphic display controlling means controls the displaying means to display graphs of the first derivative obtained by the first-order differentiating means, the second derivative obtained by the second-order differentiating means, and the higher-order derivatives obtained sequentially by the higher-order differentiating means.

Therefore, since a graph of a predetermined function, its first and second derivatives are displayed, the learner can get a higher learning effect. Especially, when the learner learns a complex function, the leaner can easily learn, utilizing the graph, without drawing the graph by hand which is a large load on the learner.

(8) According to the present invention, there is provided an electronic apparatus comprising:
  function setting means for setting a plurality of functions;
  supposing means for setting domains for the plurality of functions set by the function setting means and for supposing the relationship in magnitude between the plurality of functions in the domain;
  function producing means for producing a new function representing a difference between the plurality of functions in accordance with the relationship in magnitude between the plurality of functions supposed by the supposing means;

differentiating means for differentiating the new function produced by function producing means to provide a first derivative and for differentiating the first derivative to obtain a second derivative;

increase-decrease table data producing means for producing increase-decrease table data which displays an increase-decrease table which contains the positive and negative signs of values of the first and second derivatives in the domains set by the supposing means, and the increase-decrease state of the new function;

determining means for determining whether or not the relationship in magnitude between the plurality of functions supposed by the supposing means is correct by referring to the increase-decrease state of the new function, in the increase-decrease table data produced by the increase-decrease table data producing means, on the basis of the increase-decrease state of the new function; and displaying means for displaying the increase-decrease table on the basis of the increase-decrease table data produced by the increase-decrease table data producing means, and for displaying a result of the determination by the determining means.

According to this invention, the function setting means sets a plurality of functions. The supposing means sets the domain of the plurality of functions set by the function setting means and supposes the relationship in magnitude between the plurality of functions in the domain. The function producing means produces a new function representing the difference between the plurality of functions. The differentiating means differentiates the new function produced by the differentiating means to obtain a first derivative, and further differentiates the first derivative to obtain a second derivative. The increase-decrease table data producing means produces increase-decrease table data for displaying the increase-decrease table which contains positive and negative signs of the values of the first and second derivatives in the domain set by the supposing means, and the increase-decrease state of the new function. The determining means determines whether or not the relationship in magnitude between of the plurality of functions supposed by the supposing means is correct by referring to the increase-decrease state of the new function in the increase-decrease table data produced by the increase-decrease table data producing means. The displaying means displays the increase-decrease table on the basis of the increase-decrease table data produced by the increase-decrease table data producing means, and displays a result of the determination by the determining means. Thus, the leaner can easily learn applied problems in the differentiating method. Especially, even when a complex function is handled, an amount of the learner's handwork required for the learning is greatly reduced. Thus, even the complex function can be easily handled.

(9) According to the invention, there is provided an electronic apparatus, comprising;

dimension table containing means containing a dimension table in which a plurality of units of physical quantities are set in correspondence with a plurality of dimensions of the units;

physical quantity inputting means for inputting a physical quantity represented as a function of a predetermined variable and a unit of the physical quantity;

differentiating means for differentiating the function inputted as the physical quantity by the physical quantity inputting means with respect to a predetermined variable to obtain a derivative;

dimension table referencing means for obtaining the unit of a physical quantity which is represented by the derivative which is obtained by the differentiating means, by referencing the dimension table contained in the dimension table containing means on the basis of the unit of a physical quantity inputted by the physical quantity inputting means; and displaying means for displaying the derivative obtained by the differentiating means and the unit of a physical quantity obtained by the dimension table referencing means.

According to this electronic apparatus, the dimension table containing means contains a dimension table in which a plurality of units of physical quantities are set in correspondence with a plurality of dimensions of units. The physical quantity inputting means inputs a physical quantity represented as a function of a predetermined variable and the unit of the physical quantity. The differentiating means differentiates the function inputted as the physical quantity by the physical quantity inputting means with respect to the predetermined variable to obtain a derived function. The dimension table referencing means references the dimension table contained in the dimension table containing means to obtain the unit of a physical quantity which is represented by the derived function obtained by the differentiating means, on the basis of the unit of the physical quantity inputted by the physical quantity inputting means. The displaying means displays the derivative obtained by the differentiating means and the unit obtained by the dimension table referencing means. The learner can learn application of a differentiating method in physics. A dimension is gotten by referring to the dimension table based on the unit of the input physical quantity, and a unit is gotten by referring to the dimension table based on the dimension obtained after the differentiation. Thus, even a unit of little note and remotely related to the differentiating process can be handled securely by setting it beforehand in the dimension table, and efficiently processed. Thus, the learner can learn extensively.

(10) According to another aspect of the present invention, there is also provided a storage medium which contains a computer executable program comprising:

a program code for setting a function, a program code for differentiating the function to obtain a first-derivative;

a program code for producing increase-decrease table data to display an increase-decrease table which contains an increase-decrease state of the function, and positive and negative signs of values of the first-derivative, in predetermined domains; and a program code for causing displaying means to display the increase-decrease table on the basis of the increase-decrease table data.

According to this invention, the first-derivative is obtained from the function set by the function setting means, and the increase-decrease table of the set function is displayed. Therefore, the learner can observe the increase-decrease table without manual calculation when a graph of the function is created in the learning of differentiation. Thus, the learner's work in learning is reduced. The learner can easily understand the increase-decrease state of the graph, and create the graph efficiently. In contrast, in the conventional learning, the learner is likely to lose his strong will to learn the differentiation because simple wearisome calculations are required to be performed manually, thereby making it difficult to achieve the learning purpose that the learner should create the graph by understanding the increase-decrease state of the graph. According to the present invention, the learner can easily understand the increase-decrease state of the graph, thereby heightening his or her strong will to create the graph and increasing the learning effects.

(11) According to the present invention, there is provided a storage medium which contains a computer executable program comprising:

a program code for setting a plurality of functions;

a program code for setting domains of the plurality of functions and for supposing the relationship in magnitude between the plurality of functions in the domains;

a program code for producing a new function representing a difference between the plurality of functions in accordance with the supposed relationship in magnitude;

a program code for differentiating the new function to obtain a first derivative and for further differentiating the first derivative to obtain a second derivative;

a program code for producing increase-decrease table data for displaying an increase-decrease table which contains positiveness and negativeness of values of the first and second derivatives, and the increase-decrease state of the new function, in the set domains;

a program code for determining whether or not the relationship in magnitude between the plurality of functions is correct, by referencing the increase-decrease state of the new function in the increase-decrease table data; and a program code for displaying the increase-decrease table on the basis of the increase-decrease table data, and a result of the determination by the determining means.

Therefore, when the learner learns a mathematical solution of the relationship in magnitude between plurality of functions, using a differential calculus, a function representing the difference between the plurality of functions is produced, and an increase-decrease table for the function is produced, and then the relationship in magnitude between the plurality of functions is determined on the basis of the increase-decrease table. Therefore, the learner can easily learn applied problems of the differentiation. Especially, even when a function to be handled is complex, the learner's handwork amount is greatly reduced. Thus, the leaner can handle the function easily and learn solution of various questions.

(12) According to the present invention, there is provided a storage medium which contains a computer executable program comprising:

a program code containing a dimension table in which a plurality of units of physical quantities are set in correspondence with dimensions of the units in dimension table storing means;

a program code for inputting a physical quantity represented as a function of a predetermined variable, and the unit of the physical quantity;

a program code for differentiating the function inputted as the physical quantity with respect to the predetermined variable to obtain a derived function;

a program code for obtaining the unit of the physical quantity represented by the derived function, by referencing the dimension table contained in the dimension table containing means on the basis of the unit of the inputted physical quantity; and a program code for controlling displaying means to display the derived function and the unit obtained by the dimension table referencing means.

Therefore, when a physical quantity is calculated, utilizing differentiation, a derived function is obtained by differentiating a function representing the physical quantity and displayed along with the unit of the physical quantity shown by the derived function. Thus, the learner can learn application of the differentiation in physics. Moreover, an appropriate dimension is obtained by referencing the dimension table on the basis of the unit of the inputted physical quantity, and further an appropriate unit is obtained by referencing the dimension table on the basis of the dimension obtained after the differentiation. Thus, even a unit of little note and related remotely to the differentiation can be handled securely, and processed efficiently by previously setting the unit in the dimension table. Thus, the learner can learn the differentiation extensively.

BRIEF DESCRIPTION OF THE DRAWINGS

FIGS. 6A–E show in the graph display process of FIG. 5 a picture on which the increase-decrease table is displayed, a picture on which extreme values of a function are plotted, a picture on which a graph of the function is displayed, a picture on which a graph indicative of the convex and concave states of the function is displayed, and a picture on which a graph of the function is displayed, respectively;

FIGS. 8A, B and C show a picture on which a function and its increase-decrease table are displayed, a picture on which a graph of the function and its increase-decrease table are displayed, and a picture on which tracing in execution is displayed, respectively, in the graph tracing process of FIG. 7.

FIGS. 12A, B and C show a picture on which two input mathematical expressions are displayed, a picture on which a produced function is displayed, and a picture on which the function and its name are displayed in corresponding relationship, respectively, in the function producing process of FIG. 11;

FIGS. 15A, B and C show a picture on which an inequality and a range in which the inequality holds are displayed, a picture on which the produced function is displayed, and a picture on which the increase-decrease table is displayed, respectively, in the mathematical expression proving process of FIGS. 13 and 14;

FIG. 18 shows the composition of a dimension contrast table stored in a RAM of the computer as the seventh embodiment;

FIGS. 19A and B show a picture of an input mathematical expression and a picture of a differentiated function, respectively, in the physical calculating process of FIG. 17;

FIGS. 21A, B and C show a picture on which a function is displayed, a picture on which an answer is input by the learner, and a picture on which "GOOD" is displayed, respectively, in the derivative learning process of FIG. 20;

FIGS. 23A and B show a picture on which a mathematical expression is input and a picture on which a table of coefficients and degrees of the expression is displayed, respectively, in the coefficient learning process of FIG. 22;

FIG. 24 is a flowchart of an increase-decrease table application learning process performed by a computer as a tenth embodiment;

DETAILED DESCRIPTION OF THE PREFERRED EMBODIMENTS

Embodiments of an electronic apparatus of the present invention will be described next with reference to FIGS. 1 to 27 of the drawings.

[First Embodiment]

Figure 1:
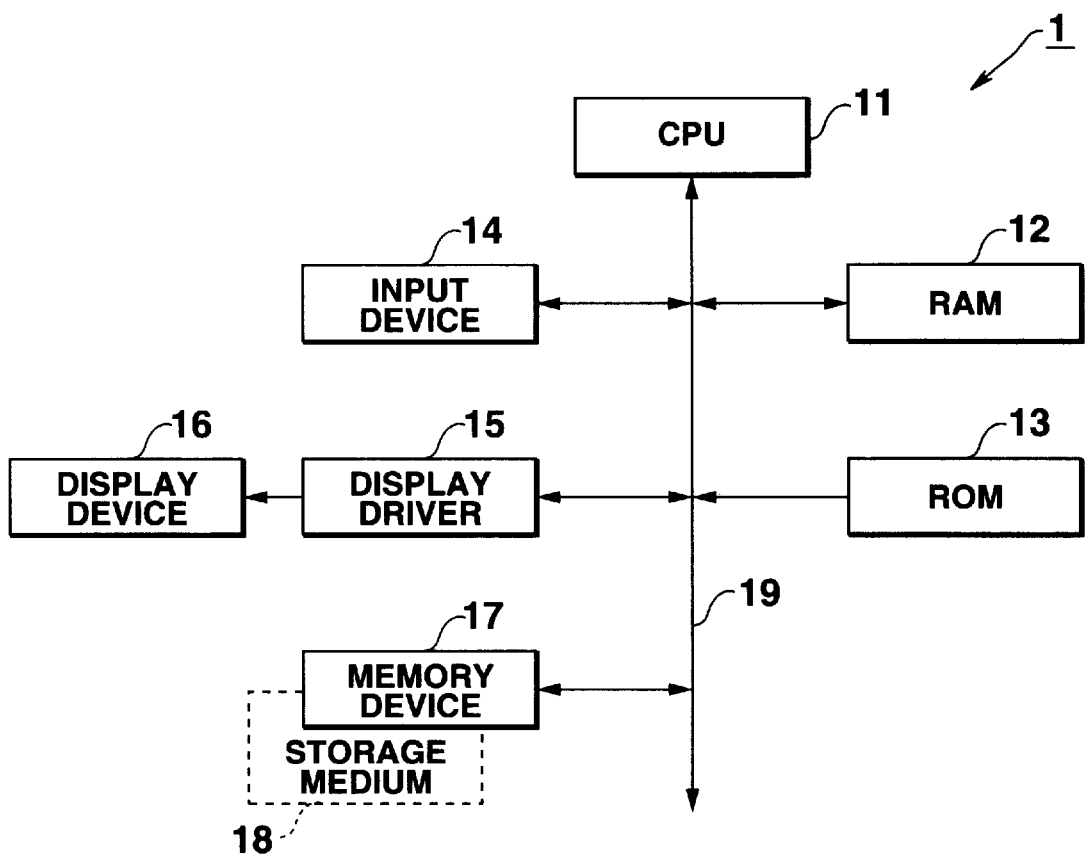
FIG. 1 is a block diagram of an internal structure of a computer as a first embodiment of the present invention.

FIG. 1 is a block diagram of an internal structure of an computer 1 as a first embodiment of the present invention.

As shown in FIG. 1, the computer 1 is composed of a CPU (Central Processing Unit) 11, a RAM (Random Access Memory) 12, a ROM (Read Only Memory) 13, an input device 14, a display driver 15, a display device 16, a memory device 17 and a storage medium 18 installed in the memory device 17. Those devices are connected with each other through a bus 19.

When a power source (not shown) of the computer 1 is turned on, the CPU 11 reads out a basic control program from ROM 13 and executes the program to put the respective elements of the computer in a state ready to operate. Then, the CPU 11 reads out from the ROM 13 or the memory device 17, predetermined programs on the basis of instructions inputted through the input device 14, stores them temporarily in the RAM 12 and executes different processes on the basis of the programs, thereby controlling the respective elements of the computer 1 in a centralized manner. Namely, the CPU 11 executes the different processes on the basis of the read out predetermined programs, stores results of the processing in the work area of the RAM 12 and further displays them on the display device 16 through the display driver 15. Moreover, the CPU 11 further stores the results of the processing in the storage medium 18 through the memory device 17 on the basis of instructions inputted through the input device 14.

Moreover, the CPU 11 calculates a derived function of a set function in an increase-decrease table blank-cell displaying process to be described in more detail hereinafter, and calculates the values of the derived function in its respective domains to produce increase-decrease table data of numerical values and signs displayed on the increase-decrease table. Moreover, the CPU 11 produces information for displaying the increase-decrease table on the display device 16 on the basis of the produced increase-decrease table data, and then delivers the information to the display driver 15, thereby displaying the information on the display device 16. Furthermore, the CPU 11 produces information for displaying as blank cells parts of the increase-decrease table data in a hidden manner, delivers the information to the display driver 15, and displays on the display device 16 the increase-decrease table with its above-mentioned part being displayed as blank.

The RAM 12 has a work area in which a specified application program, input instruction, inputted data, and data obtained by executing the different programs are stored temporarily.

The ROM 13 contains basic programs corresponding to the computer 1, namely, unrewritable basic programs such as an initially displayed menu program to be executed upon turning-on of the power source of the computer 1 and various function operating programs.

The input device 14 has a keyboard including alpha numerical data input keys, and function keys such as directional keys to specify up, down, right and left movements of a cursor and an execution key. When anyone of them is depressed, the input device 14 outputs a corresponding signal to the CPU 11.

The display driver 15 causes the display device 16 to display required information on the basis of the display information inputted from the CPU 11, and produces a drive signal on the basis of the display information inputted from the CPU 11 and executes control of the display device 16.

The display device 16 has a display screen composed, for example, of an LCD (Liquid Crystal Display) to display various data on the basis of the driving signals inputted from the display driver 15.

The memory device 17 has a storage medium 18 for storing programs, data, etc., and is composed of a magnetic or optical storage medium or a semiconductor memory. The storage medium 18 may be fixingly or removably provided on the memory device 17, and stores the various processing programs for the computer 1 and data processed by the respective processing programs.

The programs, data and the like stored in the storage medium 18 may be received through a telecommunication line or the like from an external device or a storage medium 18, which is mounted in a storage device installed in an external device, through the telecommunication line.

Figure 2:
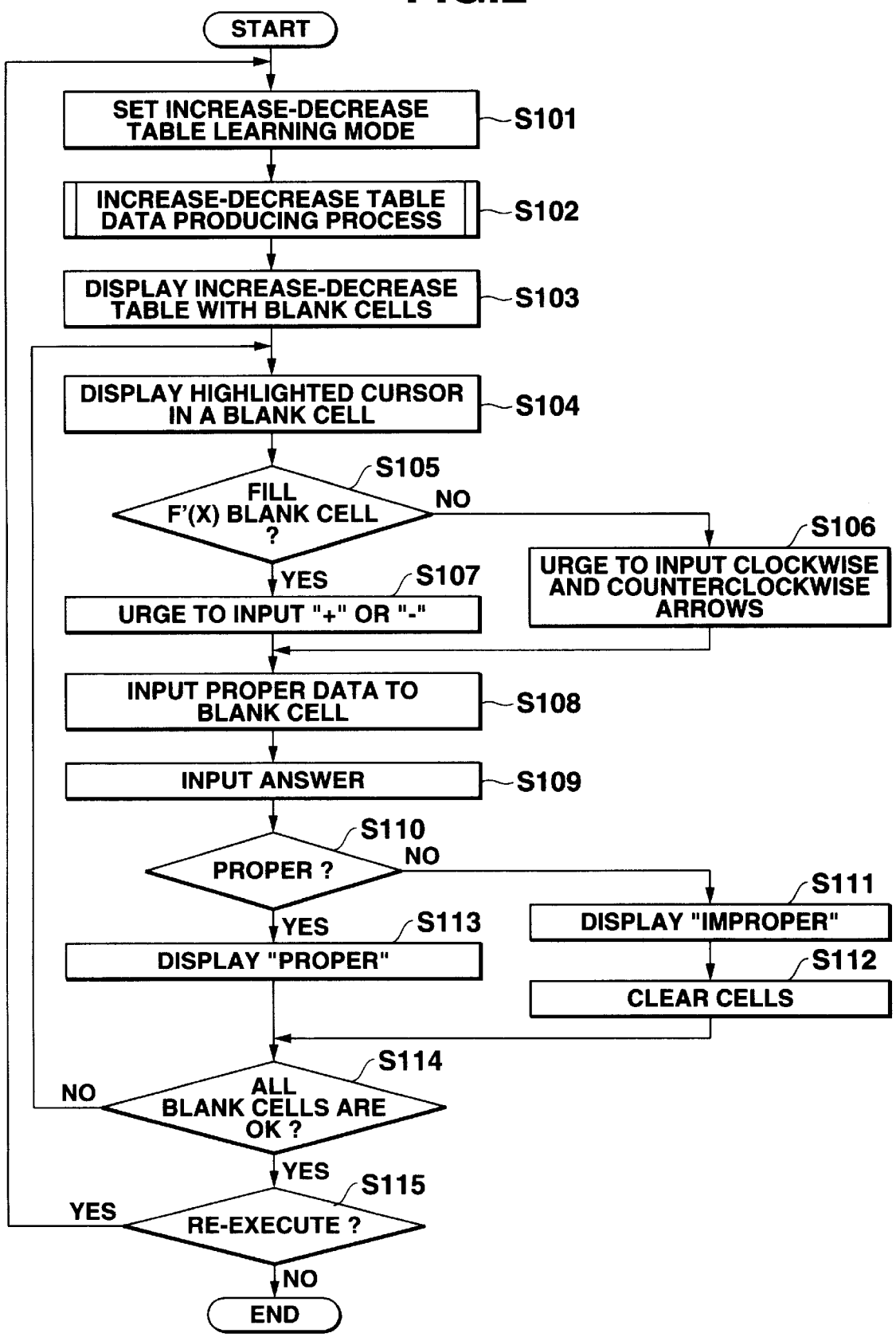
FIG. 2 is a flowchart of an increase-decrease table blank-cell learning process performed by the computer of FIG. 1.

Operation of the computer 1 will be described hereinafter with reference to FIGS. 2 to 4. FIG. 2 is a flowchart of an increase-decrease table blank-cell learning process to be executed by the computer 1. The process is used to cause the learner to fill up signs or the like in blank cells within an increase-decrease table displayed on the display device 16 to thereby learn the table.

Before the increase-decrease table blank-cell learning process, the learner inputs a function f(x) for which an increase-decrease table is to be drawn. The function f(x) may be selected by the learner from among a plurality of functions previously stored in the memory device 17 or ROM 13 of the computer 1.

In the increase-decrease table blank-cell learning process as shown in FIG. 2, the CPU 11 sets an increase-decrease table learning mode in accordance with an instruction inputted through the input device 14 (step S101), executes an increase-decrease table data producing process mentioned hereinafter (step S102), and then stores resulting increase-decrease table data temporarily in the RAM 12. Then, the CPU 11 creates display information for displaying the increase-decrease table in which some of values of a derived function f(x) in a specific domain in the increase-decrease table represented by the increase-decrease table data are displayed as blank, thereby displaying the increase-decrease table including the blank cells on the display device 16 (step S103).

Sequentially, the CPU 11 displays in a highlighted state the blank cells of the increase-decrease table displayed on the display device 16 (step S104). Then, the CPU 11 urges the user to determine whether a process for filling up blank columns of a first-order differentiation should be executed or not or (step S105).

In step S105, if no data is input by the learner or an instruction that no process for filling up the blank cells of the derived function should be performed is input (NO in step S105), the CPU 11 determines that blank cells for a second derivative f"(x) should be filled up, and moves a highlighted cursor to a blank cell for the second derivative f"(x). Then, the CPU 11 displays a picture to urge the user to input symbols "clockwise curved rightward and downward arrows and counterclockwise curved rightward and upward arrows" indicating convexity and concavity of the function f(x) on the display device 16 on the basis of the signs (positive or negative) of the values of the second derivative f"(x) (step S106).

Moreover, in step S105, when the learner instructs the computer to perform the process for filling up the blank cells for the derived function (YES in step S105), the display device 16 displays a picture to urge the learner to input signs "+" or "−" of the values of the function f(x) (step S107).

In step S106 or S107, when the urgency is displayed on the display device 16, the CPU 11 reads out the data to be displayed in the cell displayed as blank from the increase-decrease table data stored in the RAM 12 (step S108). Then, when the learner inputs an answer (step S109), the CPU 11 determines whether the inputted answer coincides with the data read out in step S108 (step S110). If so, the answer input by the learner is proper, and therefore the CPU 11 displays a message that the answer is proper on the display device 16 (step S113). The CPU 11 then shifts its control to step S114.

If not in step S110, the answer is incorrect, and therefore the CPU 11 causes the display device 16 to display that the answer is improper (step S111). The CPU 11 then clears the inputted answer in the cell, displays the cell in blank (step S112), and then shifts its control to step S114.

In step 114, the CPU 11 determines whether or not proper answers are input to all blank cells. If not, the CPU 11 returns its control to step S104, and if so, the CPU 11 shifts its control to step S115.

In step S115, the CPU 11 determines whether the increase-decrease table blank cell learning process should be executed again or not, and if an instruction of re-execution is inputted, the CPU 11 returns its control to step S101, and if not, terminates the process.

Figure 3:
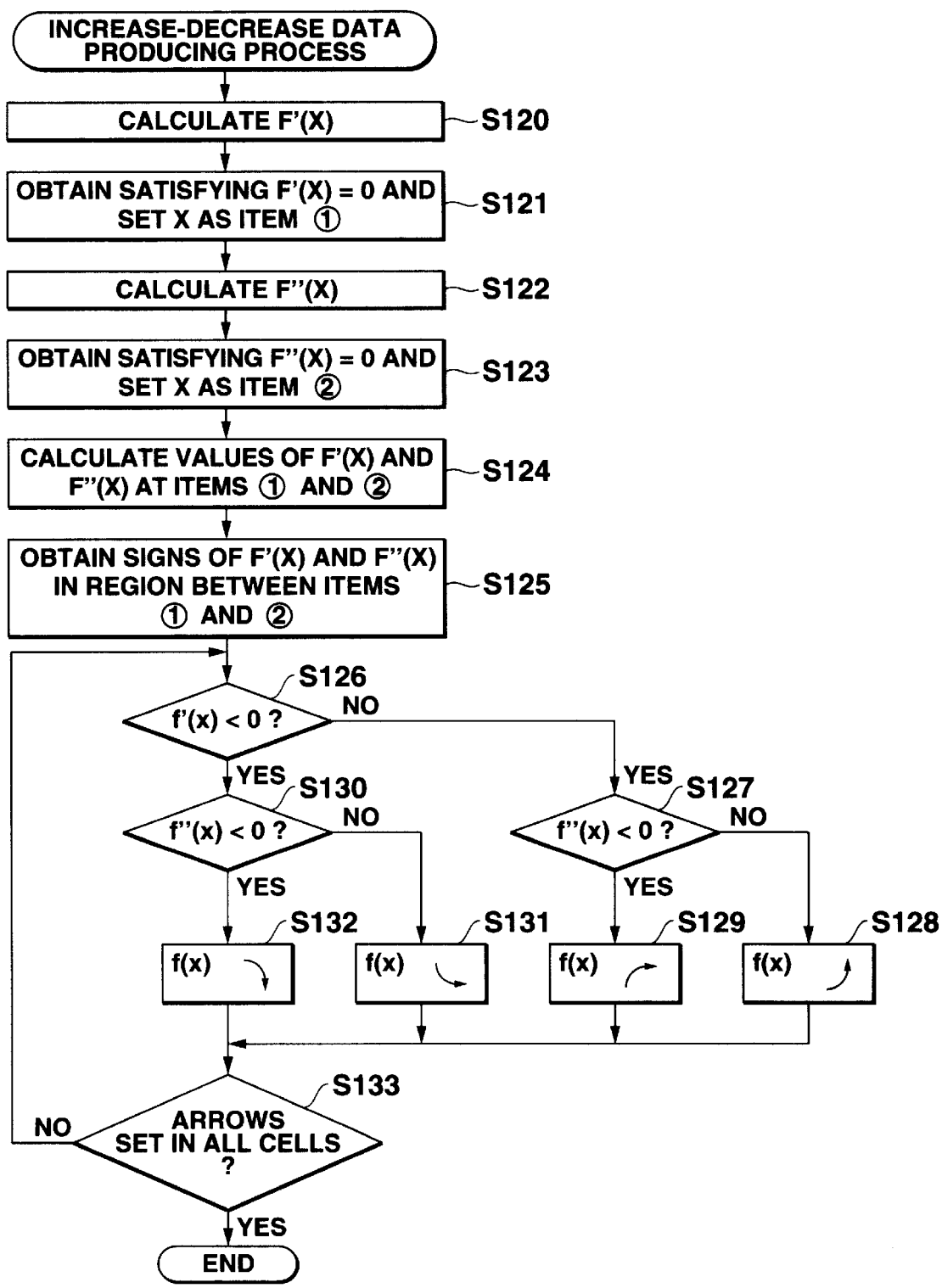
FIG. 3 is a flowchart of the details of an increase-decrease table data producing process of the process of FIG. 2.

FIG. 3 is a flow chart of details of the increase-decrease table data producing process shown in step S101 of FIG. 2, where a cubic function is set as the function f(x).

In the increase-decrease table data producing process as shown in FIG. 3, the CPU 11 differentiates the set f(x) to provide a first derivative f'(x) (step S120), further calculates a value of x as a solution of f'(x)=0, and sets the obtained value of x as an item ① (step S121).

Then, the CPU 11 calculates a second derivative f"(x) (step S122), and a value of x as a solution of f"(x)=0, and then sets the obtained value of x as an item ② (step S123).

Then, the CPU 11 calculates the values of the first and second derivatives f'(x) and f"(x) at the items ① and ②, obtained in steps S121 and S123, respectively, (step S124).

Then, the CPU 11 determines whether the values of the first and second derivatives f'(x) and f"(x) in a domain between the items ① and ② are positive or negative (step S125).

Then, the CPU 11 determines arrows representing the form of a graph of a portion of the function f(x) in each of domains of the increase-decrease table. Namely, in a specified domain, the CPU 11 determines whether the value of the first derivative f'(x) is positive or negative (step S126). If so, the CPU 11 shifts its control to step S127 where it determines whether the value of the second derivative f"(x) is positive or negative. When the value of the second derivative f"(x) is negative, the CPU 11 shifts its control to step S129 where the CPU 11 sets a clockwise-curved rightward arrow representing a graph portion of the function f(x) in the domain so as to be displayed in the increase-decrease table. Then, the CPU 11 shifts its control to step S133.

When the CPU 11 determines in step S127 that the value of the second derivative f"(x) is also positive, the CPU 11 shifts its control to step S128 where it sets a counterclockwise-curved upward arrow representing the graph of a portion of the function f(x) in the domain so as to be displayed in the increase-decrease table. Then, the CPU 11 shifts its control to step S133.

If the value of the derivative f'(x) is negative in step S126, the CPU 11 determines in step S130 whether the value of the second derivative f"(x) is positive or negative. If the value of the second derivative f"(x) is positive, the CPU 11 shifts its control to step S131, where it sets a counterclockwise-curved rightward arrow representing the graph of a portion of the function f(x) in the domain so as to be displayed in the increase-decrease table. The CPU 11 then shifts its control to step S133.

If the value of the second derivative f"(x) is negative at step S133, the CPU 11 shifts its control to step S132 where it sets a clockwise-curved downward arrow representing the graph of a portion of he function f(x) in the domain so as to be displayed in the increase-decrease table. Then, the CPU 11 shifts its control to step S133.

Then, the CPU 11 determines in step S133, whether the arrows have been set in all the cells corresponding to respective values of the variable of x in the increase-decrease table. If so, the CPU 11 terminates the process, and if not, the CPU 11 returns its control to step S126, thereby executing the series of steps S126 to S132 again.

Figure 4A:
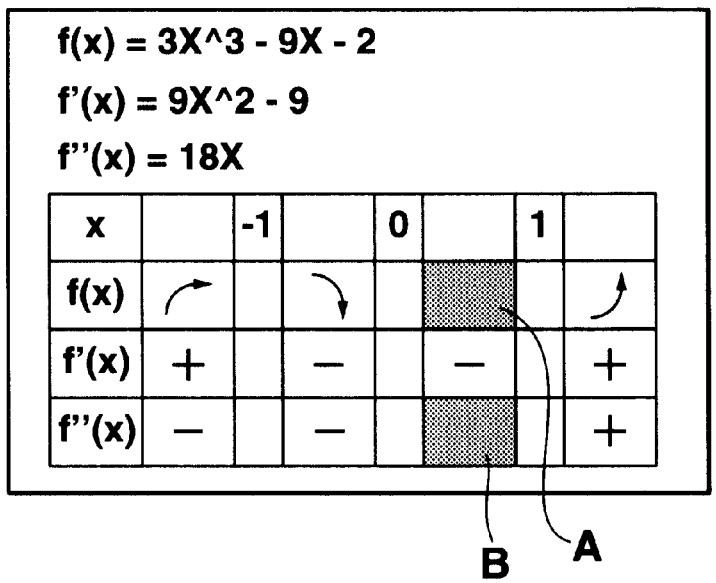
FIGS. 4A, B and C show a picture on which an increase-decrease table with blank cells is displayed, a picture on which the learner has input an answer in the picture of FIG. 4A, and a picture on which a "PROPER" message is displayed, respectively, in the increase-decrease table blank-cell learning process of FIG. 2.
Figure 4B:
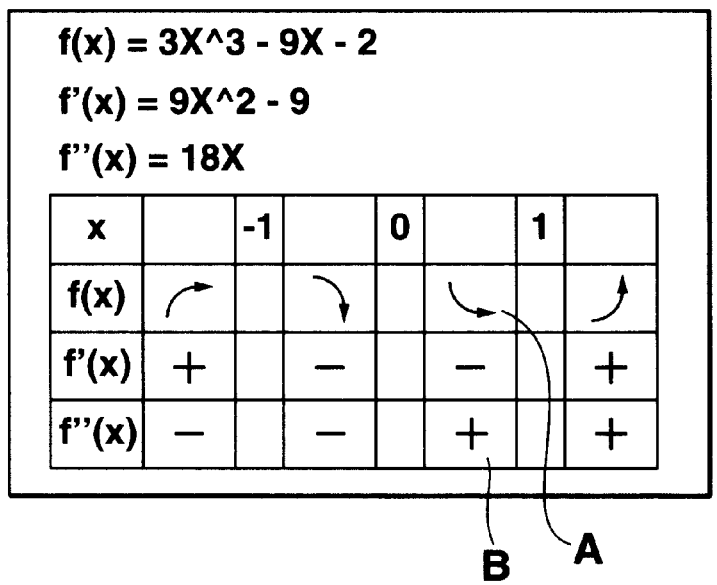
Figure 4C:
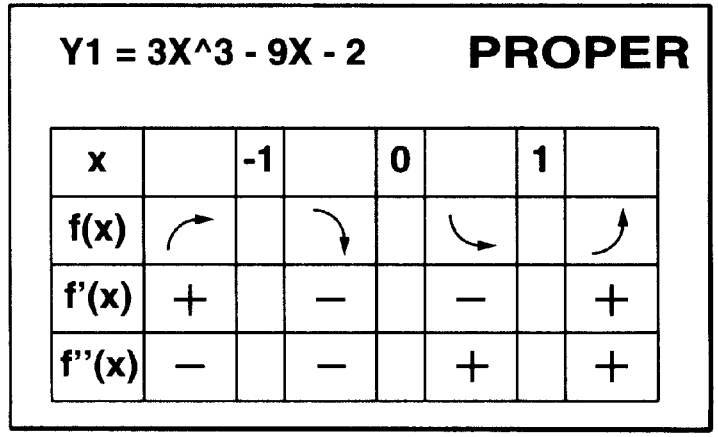

FIGS. 4A to 4C illustrate pictures displayed on the display device 16 in the increase-decrease table blank-cell learning process as shown in FIG. 2. FIG. 4A shows a picture which displays the function f(x), the first and second derivatives f'(x) and f"(x), and the increase-decrease table with the blank cells. FIG. 4B shows a picture which displays an answer inputted by the learner in the picture shown in FIG. 4A, and FIG. 4C shows a picture which displays a massage "PROPER".

The function f(x), and the first and second derivatives f'(x) and f"(x) are displayed in three lines up in the picture shown in FIG. 4A. The increase-decrease table with blank cells A and B is displayed below the three expressions in the picture. The blank cell A is for displaying therein an arrow representing the graph of a portion of the function f(x), and the blank cell B is for displaying therein the sign "+" or "−" of the value of the second derivative f"(x).

In this state, if the learner inputs answers to the blank cells A and B in FIG. 4, the answers are displayed in the cells A and B, as shown in FIG. 4B.

If the answers are proper, a message "PROPER" is displayed, as shown in FIG. 4C.

In summary, according to the computer 1 of the first embodiment of the preset invention, data for displaying an increase-decrease table for a predetermined function f(x) is produced, and information is produced for displaying the increase-decrease table with a portion of the data being hidden. The increase-decrease table with blank cells is then displayed on the display device 16. Moreover, the learner inputs as an answer arrows and signs to be filled into the blank cells. It is then determined whether the answer is proper or not by comparing the answer with the corresponding increase-decrease table data. If the answer is proper, a message to that effect is displayed. Therefore, the learner is not required to take the trouble to calculate first and second derivatives and to draw an increase-decrease table by hand, and can learn creating the table efficiently in a short time to thereby produce a high learning effect. Easy work alleviates the learner's feeling of resistance to the learning.

[Second Embodiment]

Figure 5:
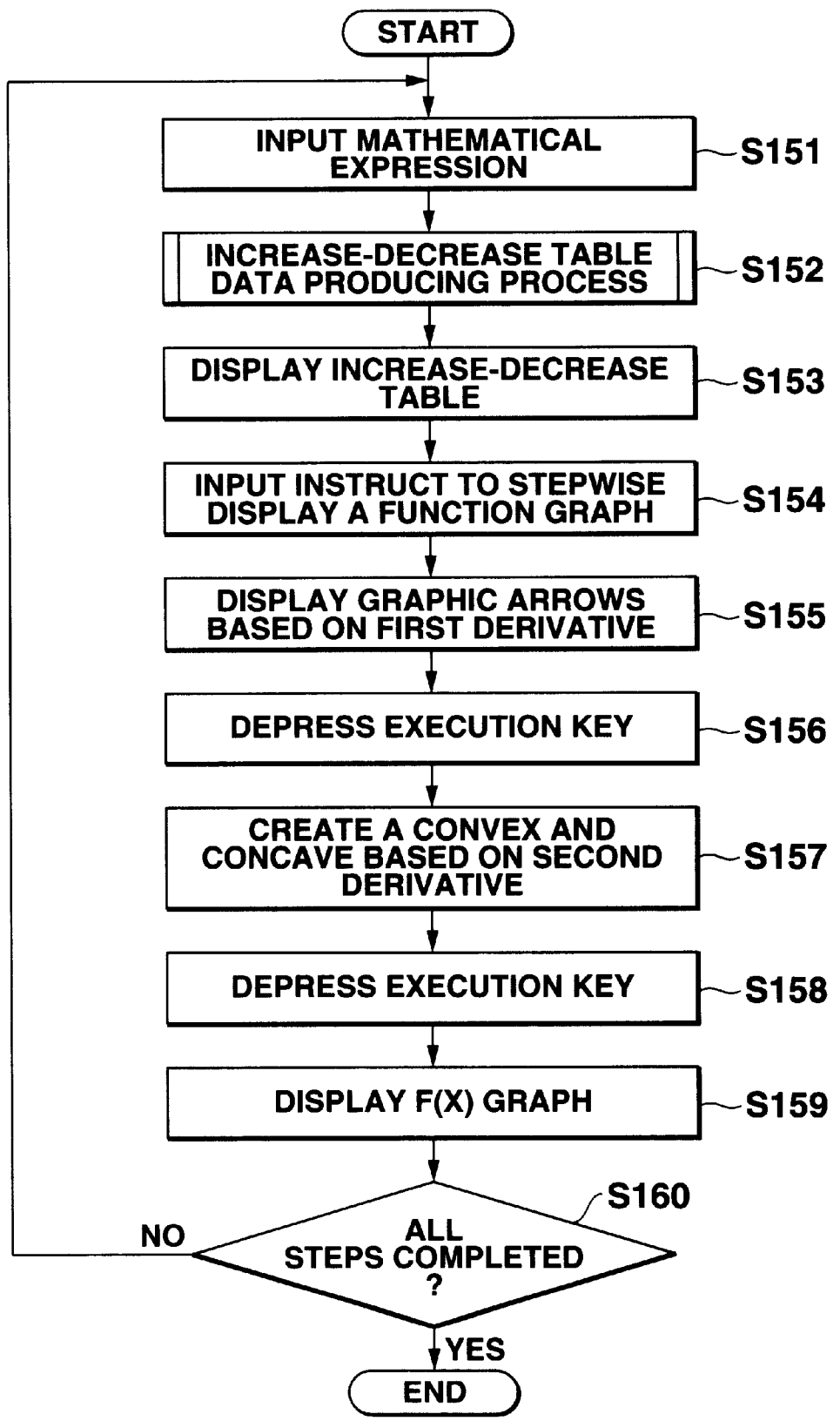
FIG. 5 is a flowchart of a graph display process performed by a computer as a second embodiment.

Referring now to FIGS. 5 and 6, the computer 1 as a second embodiment of the present invention will be described hereinafter. The computer 1 as the second embodiment has a similar construction to the computer 1 as the first embodiment. Therefore, elements having substantially the same function is identified by the same reference numeral, and further description and illustration thereof will be omitted.

FIG. 5 is a flow chart of a graph displaying process to be executed by the computer 1 as the second embodiment.

In the graph displaying process, if a mathematical expression representing a function f(x) to be processed by a learner is inputted through the input device 14 (step S151), the CPU 11 executes an increase-decrease table data producing process for the input mathematical expression (step S152). The process executed in step S152 is similar to that as shown in FIG. 3.

The CPU 11 produces information for displaying an increase-decrease table on the basis of the increase-decrease table data created in step S152, and outputs it to the display driver 15, thereby controlling the display device 16 to display the increase-decrease table (step S153).

If the learner depresses the execution key to instruct the computer to stepwise display a graph of the function f(x) (step S154), the CPU 11 displays on the display device 16 a graph which displays increases and decreases in the function f(x) by arrows on the basis of the increase-decrease table data for the function f(x) created in step S152 (step S155).

If the learner depresses the execution key again (step S156), the CPU 11 displays on the display device 16 a graph which displays the convexities and the concavities of the function f(x) by clockwise-curved rightward and downward arrows and counterclockwise-curved rightward and upward arrows (step S157).

When the learner further depresses the execution key (step S158), the CPU 11 displays the graph of the function f(x) on the display device 16 (step S159), and determines whether the whole process has been completed (step S160). If processing for a new function f(x) is necessary, the CPU 11 returns its control to step S151.

FIG. 6 shows an example of a picture displayed on the display device 16 in the graph display process as shown in FIG. 5. FIG. 6A shows a picture which displays the function f(x) and the increase-decrease table. FIG. 6B shows a picture on which extreme values of the function f(x) are plotted. FIG. 6C shows a picture on which a graph indicating increases/decreases of the function f(x) is displayed. FIG. 6D shows a picture on which a graph indicating convexities and concavities of the function f(x) is displayed. FIG. 6E shows a picture displaying the graph of the function f(x).

The picture of FIG. 6A shows the function f(x) inputted by the learner, a first derivative f'(x) obtained by differentiating the function f(x), and a second derivative f"(x) obtained by further differentiating the derived function f'(x). An increase-decrease table obtained on the basis of these functions is displayed below those functions.

The picture of FIG. 6B shows plotted values of the function f(x) at maximal and minimal points of the function f(x). The maximal and minimal values of the function f(x) can be obtained from values of the variable x when the values of the first and second derivatives f'(x) and f"(x) are zero. Moreover, the maximal and minimal values are also shown on the increase-decrease table of FIG. 6A.

The picture of FIG. 6C shows arrows indicating increases and decreases in the values of a graph of a portion of the function f(x) between the plotted points on the picture of FIG. 6B, on the basis of signs (positive and negative) of the values of the first derivative f'(x) in the respective domains. The arrows merely show only increases or decreases in the values of the function f(x). To this end, arrows of a straight line are used.

The picture of FIG. 6D shows the state of the graph of the portion of the function f(x) between the plotted points on the picture of FIG. 6B, and four kinds of arrows; that is, clockwise-curved rightward and downward arrows and counterclockwise-curved rightward and upward arrows of the graph form, on the basis of the signs (positive and negative) of the values of the second derivative f"(x) in the respective domains. The picture of FIG. 6E shows a curve indicating the graph of the function f(x).

In summary, according to the computer 1 as the second embodiment, a derived function f'(x) is obtained by differentiating a function f(x) inputted by the learner. Furthermore, a second derivative f"(x) is obtained by further differentiating the derived function f'(x). An increase-decrease table is displayed on the basis of the values of the function and its signs (positive and negative) in the respective domains. For example, as the "execution" key is depressed sequentially by the learner, a graph in which extreme values of the function f(x) are plotted, a graph in which only increases/decreases in the function f(x) are displayed by straight arrows, increases/decreases in the value of the function f(x), and a graph of a function f(x) whose form is shown by clockwise-curved rightward and downward arrows and counterclockwise-curved rightward and upward arrows, and a graph of the function f(x) are sequentially displayed.

Thus, a calculation process similar to a calculation performed in manually drawing the graph of the function, and the increase-decrease table are displayed to the learner. Further, each function and its numerical values displayed in the increase-decrease table are displayed. Thus, the learner can efficiently learn drawing the graph utilizing the increase-decrease table, the relationship between the increase-decrease table and the graph, and the relationship between the function, the first derivative and the second derivative.

[Third Embodiment]

Figure 7:
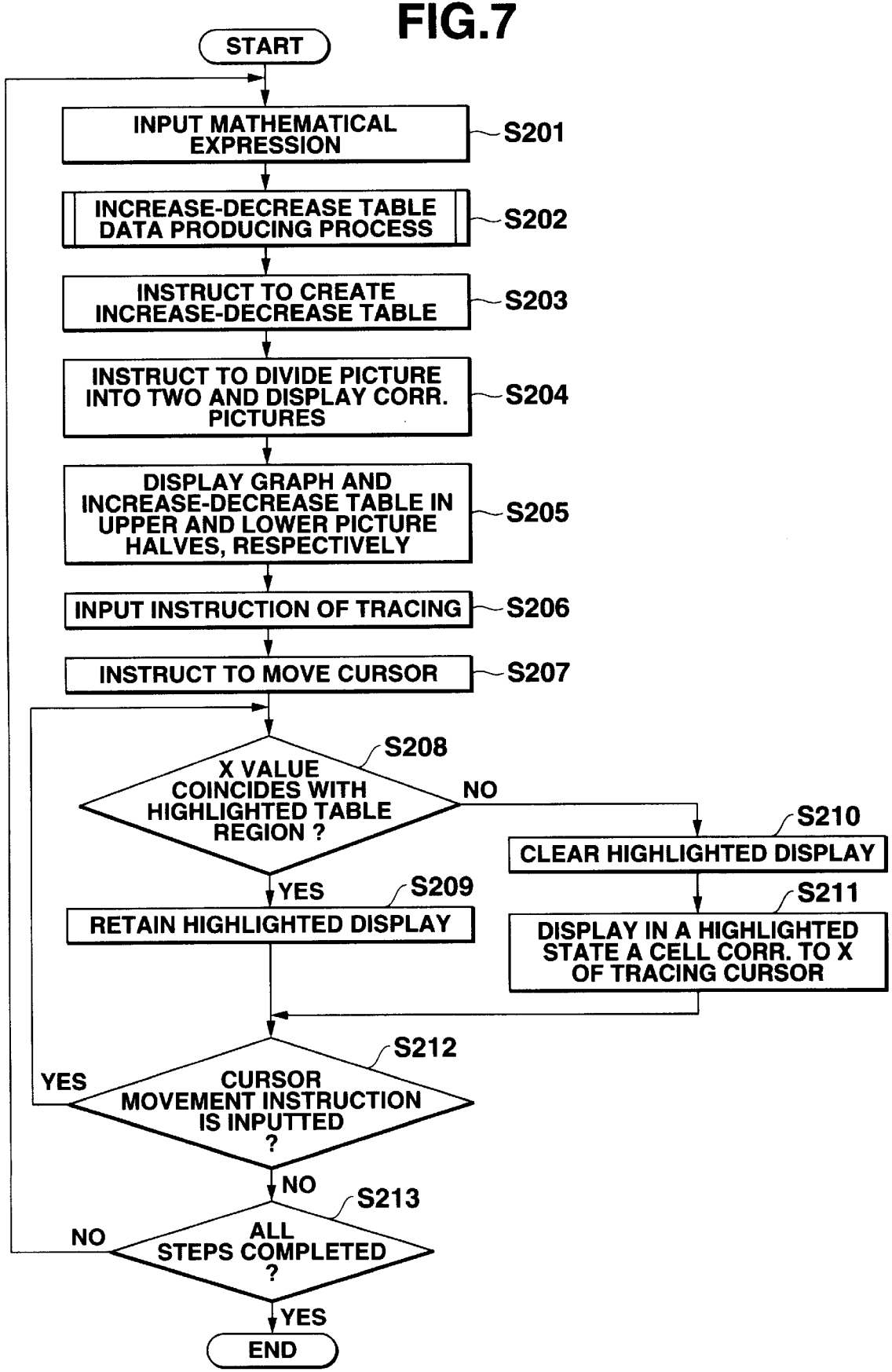
FIG. 7 is a flowchart of a graph tracing process performed by a computer as a third embodiment.

FIG. 7 is a flow chart of a graph tracing process to be executed by the computer 1 as the third embodiment. FIG. 8 shows a picture displayed on the display device 16 in the graph tracing process of FIG. 7. The third embodiment will be described in FIGS. 7 and 8 hereinafter. The computer 1 as the third embodiment has a similar construction to the computer 1 as the first embodiment. Therefore, the same reference numeral is used to identify similar elements of those embodiments and further illustration and description thereof will be omitted.

In the graph tracing process of FIG. 7, when a function f(x) is inputted by the learner (step S201), the CPU 11 executes an increase-decrease table data producing process for displaying an increase-decrease table (step S202). This process is similar to that of FIG. 3.

Then, when the learner input an instruction to create the increase-decrease table, the CPU 11 displays the increase-decrease table on the display device 16 on the basis of the increase-decrease table data produced in step S202 (step S203).

When the learner keys in an instruction to display two independent subpictures on the display device 16 (step S204), the CPU 11 divides the picture into an upper and a lower half, and displays the display screen of the function inputted in step S201 and the increase-decrease table in the upper and lower halves, respectively, of the display screen (step S205).

When the learner keys in an instruction of trace execution at the input device 14 (step S206), the CPU 11 executes the following tracing process, which includes emphatically displaying a cursor on a graph of the function displayed on the display device 16, and moving the cursor along the curve of the graph in a tracing manner. During movement of the cursor, a cell of a domain containing the x-coordinate of the cursor is emphatically displayed in the increase-decrease table displayed on the display device 16.

After the instruction of the trace execution is inputted in step S206, the CPU 11 displays the cursor on the graph which is displayed on the display device 16, and further displays in a highlighted state a domain containing the x-coordinate of the cursor in the increase-decrease table displayed on the display device 16.

Then, when the learner inputs an instruction of cursor movement (step S207), the CPU 11 moves the cursor along the curve of the graph in a tracing manner.

Then, the CPU 11 determines whether the x coordinate of the cursor coincides with a highlighted region of the increase-decrease table (step S208). If so, the CPU 11 maintains the highlighted display (step S209), and then shifts its control to step S212. If not at step S208, the CPU 11 clears the highlighted display in the increase-decrease table (step S210), displays in a highlighted state a cell corresponding to the x-coordinate of the tracing cursor (step S211), and then shifts its control to step S212.

In step 212, the CPU 11 determines whether a further instruction to move the cursor has been inputted (step S212). If so, the CPU 11 returns its control to step S208, and if not, shifts its control to step S213, where the CPU 11 determines whether the whole process has been completed (step S213). When the process should be continued further, the CPU 11 returns its control to step S201.

In connection with the graph tracing process of FIG. 7, FIG. 8A shows a picture which displays the function and the increase-decrease table, FIG. 8B shows a picture which displays the graph of the function and the increase-decrease table, and FIG. 8C shows a picture which displays tracing in execution.

In FIG. 8A, the function f(x) inputted by the learner, its first derivative f'(x) and second derivative f"(x) are displayed up in the picture. The increase-decrease table produced on the basis of the these functions is displayed below the functions in the picture, thereby helping the learner draw a graph.

Then, as shown in FIG. 8B, the picture is divided into an upper and a lower half in which the graph and the increase-decrease table are displayed, respectively.

If the learner instructs the computer to execute tracing in the state in which the picture shown in FIG. 8B is displayed on the display device 16, the cursor is displayed on the graph as shown in FIG. 8C and a cell containing the x-coordinate of the cursor is displayed in a highlighted state in the table. The highlighted cell of the increase-decrease table is sequentially shifted so as to follow the movement of the cursor. When the cursor moves out of the highlighted cell, its highlighted display is cleared, and then a cell containing a new x-coordinate of the cursor is displayed in a highlighted state.

A mathematical expression of the f(x) which is displayed as a graph is indicated up in the picture as shown in FIG. 8C, and coordinates indicating the present position of the cursor are displayed below the graph. Thus, the learner can compare a y coordinate of the cursor and the increase-decrease table to more effectively learn the increase-decrease table.

In summary, according to the computer 1 as the third embodiment, a graph and a corresponding increase-decrease table are displayed on the display device 16, and further the cursor is displayed on the graph. As the cursor moves along the graph in accordance with the learner's instruction, a domain containing an x-coordinate of the cursor in the increase-decrease table is displayed in a highlighted state. Thus, the relation between the graph and the increase-decrease table is clearly displayed to the learner and hence the learner can effectively learn the increase-decrease table.

The picture displayed on the display device 16 is divided into an upper and a lower half, in which the graph and the increase-decrease table are displayed, respectively. A mathematical expression of a function inputted by the learner is displayed above the graph, and further the x and y coordinates of the position of the cursor are displayed below the graph. Thus, the learner can compare and learn the mathematical expression of the function, the graph, and the increase-decrease table. Moreover, the learner can compare the y coordinate of the cursor with extreme values displayed in the increase-decrease table, and hence the learner can learn the increase-decrease table more efficiently.

[Fourth Embodiment]

Figure 9:
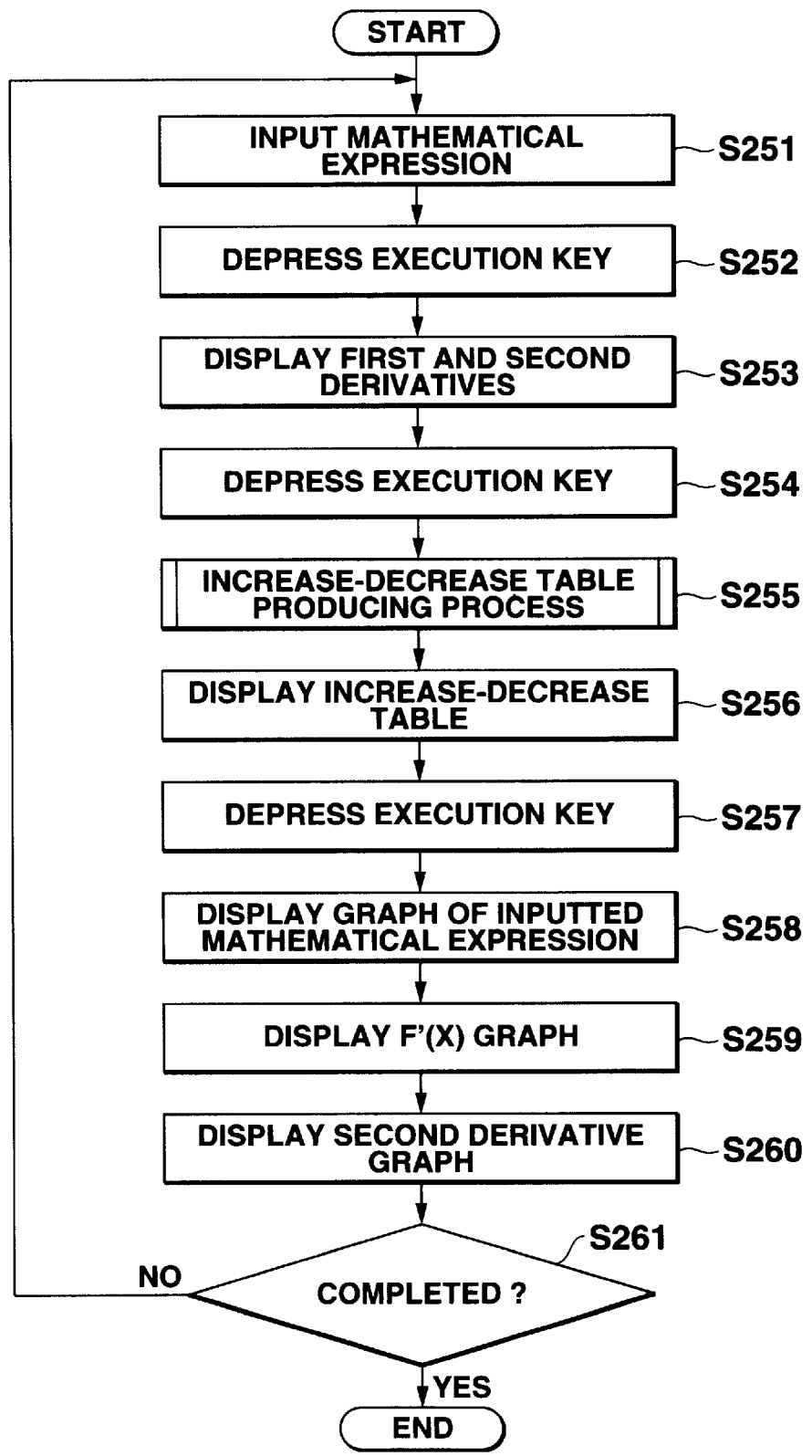
FIG. 9 is a flowchart of a derivative graph display process performed by a computer as a fourth embodiment.

FIG. 9 is a flow chart of a derivative graph displaying process to be executed by the computer 1 as the fourth embodiment of the present invention. FIG. 10 shows an example of the picture displayed on the display device 16 in the derivative graph displaying process as shown in FIG. 9. The fourth embodiment will be described hereinafter with reference to FIGS. 9 and 10. The computer 1 as the fourth embodiment has a similar construction to the computer 1 in the first embodiment. Therefore, the same reference numeral is used to identify similar elements of the computers of the fourth and first embodiments, and further illustration and description thereof will be omitted.

In the derivative graph displaying process as shown in FIG. 9, first, a mathematical expression of a function f(x) to be processed is inputted by the learner (step S251). Then, the execution key of the input device 14 is depressed by the learner (step S252).

The CPU 11 differentiates the input function f(x) to provide a derivative f'(x), further differentiates the f'(x) to provide a second derivative f"(x), and then displays those functions f'(x) and f"(x) on the display device 16 (step S253).

If the learner again depresses the execution key (step S254), the CPU 11 performs an increase-decrease table data producing process for producing an increase-decrease table (step S255). The increase-decrease table data producing process in step S255 is similar to that shown in FIG. 3.

Then, the CPU 11 creates information for displaying the increase-decrease table on the basis of the produced increase-decrease table data, provides it for the display driver 15, and causes the display driver to control the display device 16 so as to display the increase-decrease table (step S256).

Then, when the execution key is depressed by the learner (step S257), the CPU 11 first causes the display device 16 to display a graph of the function f(x) inputted by the learner in step S251 (step S258).

Furthermore, the CPU 11 causes the display device 16 to display a graph of f'(x) calculated and displayed in step S253 (step S259). Similarly, it also causes the display device 11 to display a graph of the second derivative f"(x) (step S260).

The CPU 11 then determines whether the series of processes has been completed (step S261), and then, if similar processes should be performed for other functions, the CPU 11 returns its control to step S251.

FIGS. 10A–D show a picture on which a mathematical expression of a function is input, a picture on which the input function, its first and second derivatives are displayed, a picture on which the increase-decrease table is displayed, and a picture on which graphs of the input function, and its first and second derivatives are displayed, respectively, in the derivative graph display process of FIG. 9.

Figures 10A, 10B, 10C, 10D:
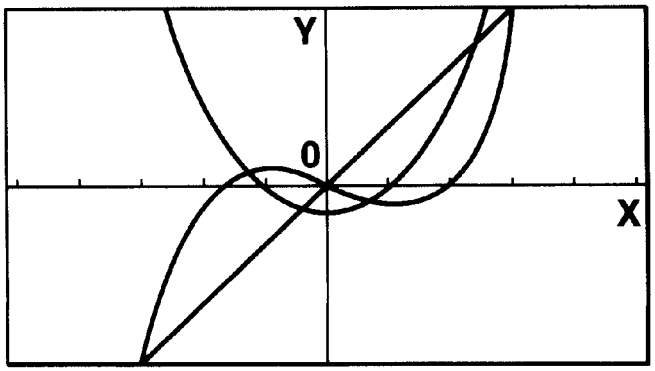
FIGS. 10A–D show a picture on which a mathematical expression of a function is input, a picture on which the input function, its first and second derivatives are displayed, a picture on which the increase-decrease table is displayed, and a picture on which graphs of the input function, and its first and second derivatives are displayed, respectively, in the derivative graph display process of FIG. 9.

As shown in FIG. 10A, when a mathematical expression is input by the learner, the CPU 11 stores this expression as a function f(x) and displays it on the display device 16. The CPU 11 then differentiates the function f(x) to calculate a derivative f'(x) and further differentiates the derivative f'(x) to calculate a second derivative f"(x).

As shown in FIG. 10B, the CPU 11 then causes the display device 16 to display the f(x), f'(x) and f"(x).

As shown in FIG. 10C, the CPU 11 also causes the display device 11 to display an increase-decrease table about the function f(x).

After the learner has keyed in an instruction of execution, the CPU 11 causes the display device 11 to display an x-y coordinate system, and graphs of f(x), f'(x) and f"(x), as shown in FIG. 10D. The display device may display a screen ruled into squares in addition to the X-Y coordinate system.

In summary, according to the computer 1 as the fourth embodiment, when the learner inputs a function f(x), the CPU differentiates the function f(x) to provide its derivative f'(x) and then its second derivative f"(x), and then causes the display device 11 to display their graphs along with its increase-decrease table. Therefore, the learner can efficiently learn the relationship between the function, its first derivative and second derivative in more detail to thereby achieve effective learning of differentiation.

[Fifth Embodiment]

Figure 11:
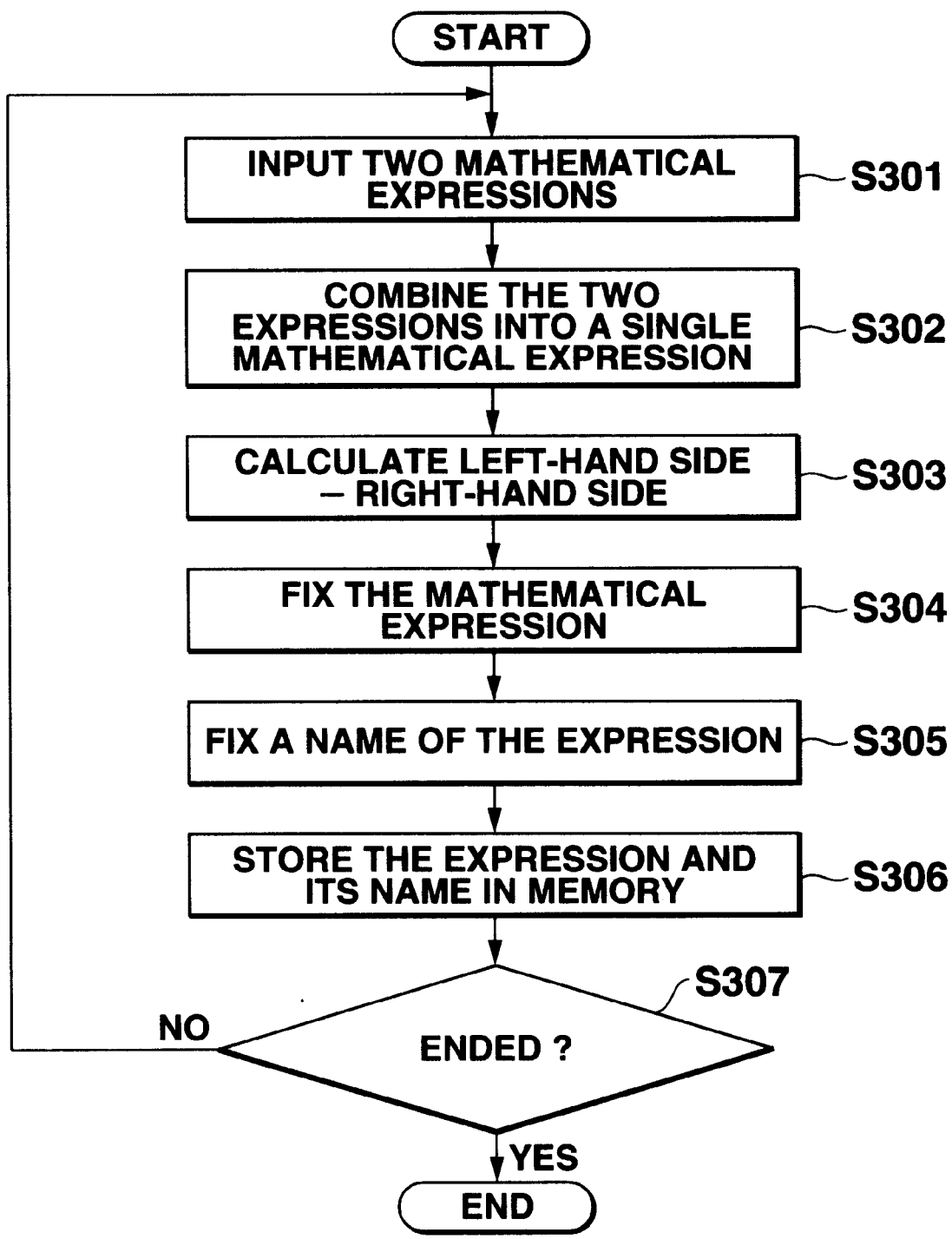
FIG. 11 is a flowchart of a function producing process performed by a computer as a fifth embodiment.

FIG. 11 is a flowchart of a function producing process performed by the computer 1 as the fifth embodiment of the present invention. FIG. 12 illustrates a picture displayed on the display device 16 in the function producing process of FIG. 11.

The fifth embodiment will be described next with reference to FIGS. 11 and 12. The computer 1 has a similar composition to that of the computer of the first embodiment. The same reference numeral is used to denote similar elements of the computers of those embodiments and further illustration and description will be omitted.

In the function producing process of FIG. 11, when two original mathematical expressions are input by the leaner (step S301), the CPU 11 combines the two input expressions with a symbol "=" to produce a single mathematical expression (step S302).

Then, the CPU 11 transposes all terms of the right-hand side of the expression produced in step S302 to the left-hand side to produce an expression in the form of left-hand side terms minus the right-hand side terms (step S303).

The CPU 11 then fixes the obtained expression as a function to be processed later (step S304). In this step, the CPU 11 may display the expression on the display device 16 and urge the learner to key in an instruction to fix the expression. When the learner keys in a fix instruction, the CPU 11 performs a next step.

Then, the CPU 11 gives names such as f1(x), f2(x), . . . to the expressions fixed in step S304, displays the expressions along with their names on the display device 16 and then urges the learner to fix the expressions (step S305). When the learner fixes the expressions, the CPU 11 stores the names and the corresponding expressions in RAM 12 or the memory device 17 (step S306).

Then, the CPU 11 checks whether a series of similar processes should be performed on other mathematical expressions (step S307). If so, the CPU 11 returns its control to step S301, and if there are no other mathematical expressions whose magnitudes are to be compared with, terminates the process.

FIGS. 12A, B and C show a picture on which two input mathematical expressions are displayed, a picture on which a produced function is displayed, and a picture on which the function and its name are displayed in corresponding relationship, respectively, in the function producing process of FIG. 11.

The picture of FIG. 12A shows two input mathematical expressions "3X^3−2X^2−2" and "−2X^2+9X−4". In order to produce a mathematical expression to examine the relationship in magnitude between those two expressions, the two mathematical expressions are combined with "=", as shown.

In FIG. 12B, a mathematical expression produced by transposing all the right-hand side terms of the expression of FIG. 12A to the left-hand side is displayed as a function. As shown in FIG. 12B, the right-hand side becomes zero, and the left-hand side is handled, for example, as the function f1(x).

The CPU 11 then gives a name to the produced function. The CPU 11 sequentially gives names, for example, f1(x), f2(x), . . . to the functions which the CPU 11 handles.

FIG. 12C shows a picture on which a list of functions and their names given in corresponding relationship by the CPU 11. In the picture of FIG. 12C, the function f1(x) is displayed as "3X^3−9X+2". In addition, the CPU 11 can store a plurality of functions and corresponding names in the RAM 12 or memory device 17.

In summary, according to the computer 1 of the fifth embodiment, when two mathematical expressions are input, a single function indicative of the difference between those expressions is produced and stored in the RAM 12 or memory device 17. Thus, a preprocess which processes the relationship between two mathematical expressions, using a function, is performed efficiently.

By performing the function producing process by the computer 1 of the fifth embodiment as a preprocess for a process performed in a sixth embodiment, a process for determining the relationship in magnitude between the two mathematical expressions can be performed especially efficiently.

[Sixth Embodiment]

Figure 13:
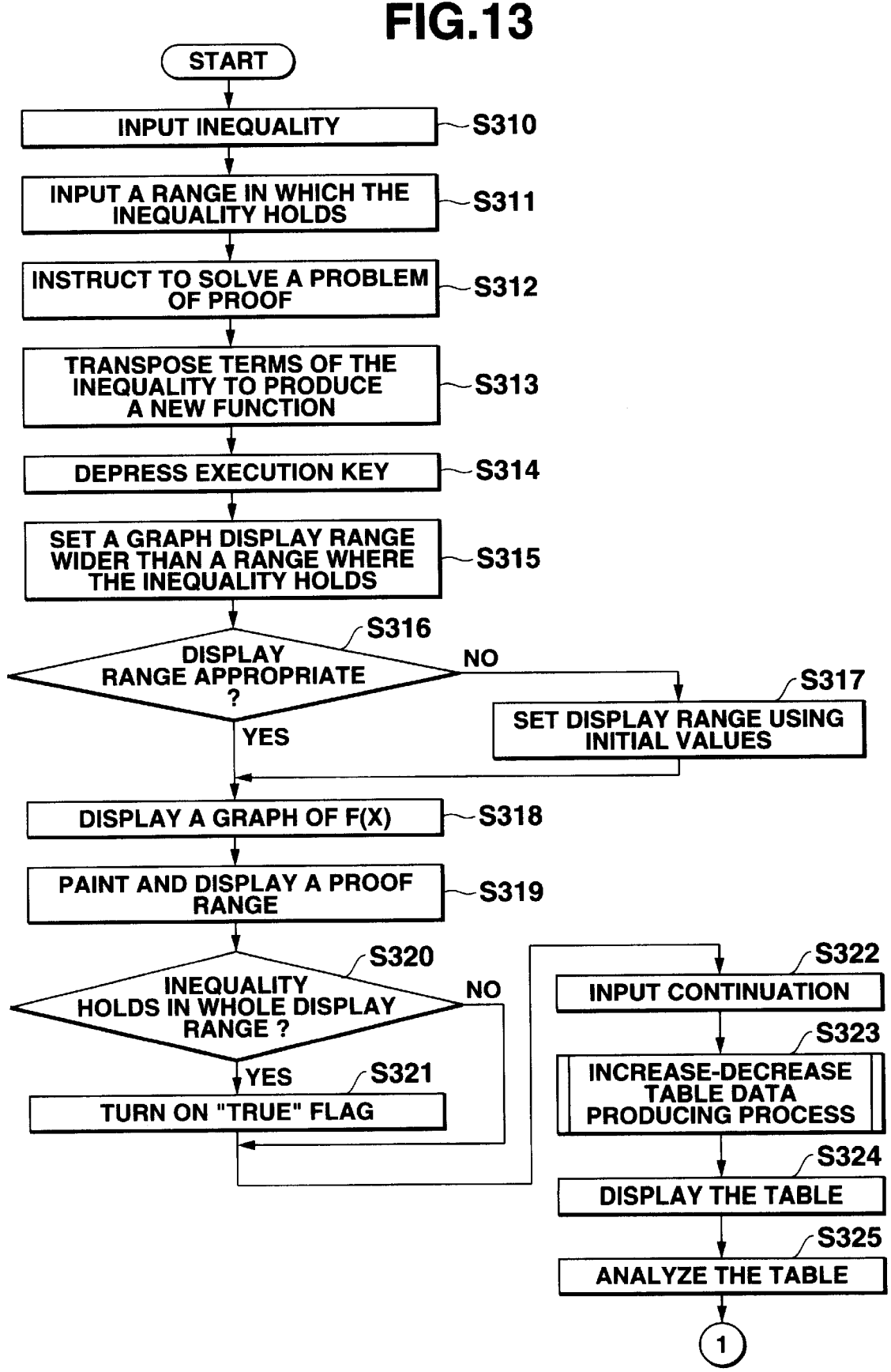
FIG. 13 is a flowchart of a mathematical expression proving process performed by a computer as a sixth embodiment.
Figure 14:
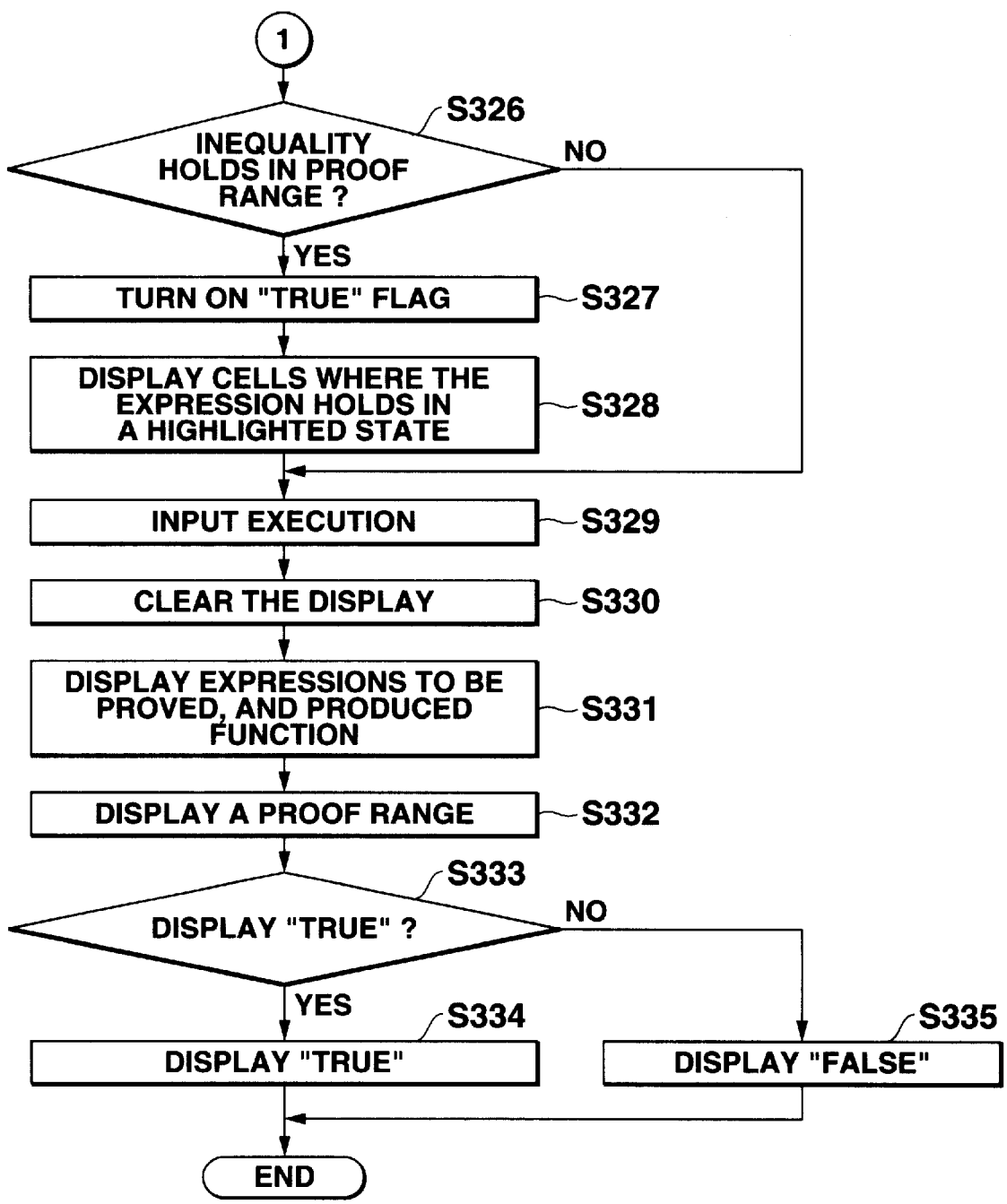
FIG. 14 is a flowchart continued to the flowchart of FIG. 13.

FIGS. 13 and 14 are combined to indicate a single flowchart of a mathematical expression proving process performed by a computer as a sixth embodiment. FIGS. 15A, B, C and 16A, B show pictures displayed on the display device 16 in the mathematical expression proving process. The computer 1 of the sixth embodiment has a similar composition to that of the computer 1 of the first embodiment. Similar elements of the computers of the sixth and first embodiment are identified with the same reference numeral and further illustration and description thereof will be omitted.

In a mathematical expression proving process of FIG. 13, the learner first inputs an inequality to be processed (step S310) and also inputs a range in which the inequality holds (step S311).

When the CPU 11 is instructed to solve a problem of proof at the input device 14 (step S312), the CPU 11 transposes all the right-hand terms of the inequality input in step S310 to the left-hand side to put the right-hand side at zero and hence set or produce the left-hand side as a new function (step S313).

If, for example, an inequality "X^3−3X+1>3X^2−3X−1" is input, and this inequality holds, an inequality "X^3−3X^2+2>0" produced by transposing all the right-hand terms to the left-hand side also holds.

Thus, if it is proved that the value of f(x)=X^3−3X^2+2 is larger than zero in the range "1/2>X>−1/2" where the inequality holds, it is proved that the inequality holds.

When the learner depresses the execution key, the CPU 11 sets as a graph display range a range which contains, and is wider than, the range input in step S311 (step S315).

The CPU 11 then determines whether the set graph display range is proper or appropriate. If the set range is excessively large or inappropriate, it sets the graph display range as a preset predetermined initial one (step S317), and then shifts its control to step S318.

If the graph display range set in step S315 is appropriate, the CPU 11 directly shifts its control to step S318, where the CPU 11 displays a graph of the function f(x) produced in step S313 in the graph display range set in step S315 or S317.

The CPU 11 then paints the range where the inequality input in step S311 holds in a color different from that of the background of the picture to display the range emphatically (step S319), and then determines whether the inequality holds (step S320).

If so, the CUP 11 turns on a TRUE flag (not shown) stored in RAM 12 (step S321), and then shifts its control to step S322. If the inequality input in step S310 does not hold, or if it cannot clearly be confirmed from the graph that the inequality holds, the CPU 11 directly shifts its control to step S322. In step S320, the CPU 11 may display on the display device 16 the result of the determination about whether the inequality holds, and also report this fact to the learner.

When in step S222 the learner keys in an instruction to continue the process, the CPU 11 performs an increase-decrease table data producing process to display an increase-decrease table about the function f(x) (step S323). This process is similar to that of FIG. 3.

Then, the CPU 11 produces information to display the increase-decrease table, delivers it to the display driver 15, displays a corresponding increase-decrease table on the display device 16 (step S324), and then determines whether the inequality holds based on the displayed increase-decrease table (step S325).

The CPU 11 then determines whether the inequality holds in the range input in step S311 (step S326 of FIG. 14). If so, the CPU 11 turns on the TRUE flag in the RAM 12 (step S327), displays in a highlighted state the cells of the domain of the increase-decrease table displayed on the display device 16 where the inequality holds (step S328), and then shifts its control to step S329.

If not in step S326, the CPU 11 directly shifts its control to step S329.

Also, in step S326, the CPU 11 may display the result of the determination on the display device 16 as in step S320 (FIG. 13).

When the learner keys in an instruction to continue the processing in step S329, the CPU 11 clears the whole picture displayed on the display device 16 (step S330), causes the display device 16 to display the mathematical expression input in step S310 (FIG. 13) as a one to be proved, and a mathematical expression indicative of the function produced in step S313 based on the input expression (step S331), and also causes the display 16 to display the range input in step S311 (step S332).

The CPU 11 determines whether the TRUE flag stored in the RAM 12 is on (step S333). If so, the CPU 11 causes the display device 16 to display "TRUE" (step S334), and if not, the CPU 11 causes the display device 16 to display "FALSE" indicating that the proof is impossible.

FIG. 15A, B and C show a picture on which an inequality and a range in which the inequality holds are displayed, a picture on which the produced function is displayed, and a picture on which the increase-decrease table is displayed, respectively, in the mathematical expression proving process of FIGS. 13 and 14.

Figures 16A, 16B:
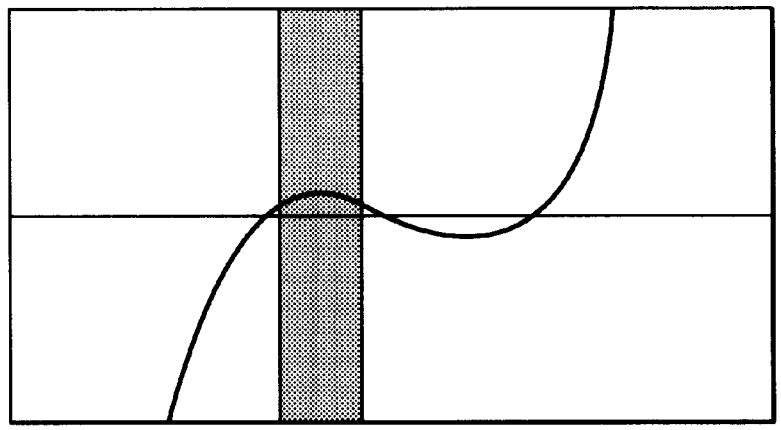
FIGS. 16A and B show a picture on which a graph of the function is displayed and a picture on which the mathematical expression and a result of determining whether the inequality holds are displayed, respectively, in the mathematical expression proving process of FIGS. 13 and 14.

FIGS. 16A and B show a picture on which a graph of the function is displayed and a picture on which the mathematical expression and a result of determining whether the inequality holds are displayed, respectively, in the mathematical expression proving process of FIGS. 13 and 14.

As shown in FIG. 15A, the mathematical expression which the learner inputs is an inequality. The picture of FIG. 15A shows a cubic inequality, which does not hold in every domain of a variable x, and the domain in which the inequality holds is limited and input by the learner.

A function of FIG. 15B is produced in order that the CPU 11 processes the data, using a derivative and a graph based on the input inequality. FIG. 15B also shows as a function f(x) an inequality obtained by transposing all the right-hand side terms of the inequality displayed on the picture of FIG. 15A to the left-hand side.

FIG. 15C shows an increase-decrease table created based on the produced function f(x) and displayed on the picture. In the table, the cells of the function f(x) corresponding to the domain of the variable x which is in "−1/2<x<1/2" are displayed in a highlighted state.

When the CPU 11 determines that the inequality holds, by analyzing the increase-decrease table of FIG. 15C, it causes the display device to display in a highlighted state the cells of the range in which the inequality holds.

The picture of FIG. 16A displays a graph of the function f(x) produced based on the inequality input by the learner.

When the CPU 11 determines that the input inequality holds based on the graph of the function f(x), it causes the display device 16 to display in a highlighted state a range of x where the inequality holds, as shown in FIG. 16A.

The picture of FIG. 16B displays the function f(x) and also characters "TRUE", which appears when the CPU 11 determines that the input inequality has held and that the "TRUE" flag is on.

In summary, according to the computer 1 of the sixth embodiment, when the learner inputs an inequality and a range of a variable where the inequality holds, the CPU 11 produces a function f(x) based on the input inequality, causes the display device to display a graph of the function, and determines whether the inequality holds based on the displayed graph. If so, the CPU 11 causes the display device 16 to display in a highlighted state a range where the inequality involving the graph holds, and turns on the TRUE flag. The CPU 11 further causes the display device 16 to display the increase-decrease table of the function f(x), analyzes the table to determine whether the inequality holds. If so, it displays in a highlighted state the cells corresponding to the range where the inequality holds, and turns on "TRUE" flag. Thereafter, the CPU 11 causes the display device 16 to display "TRUE". If the TRUE flag is not on, the CPU causes the display device 16 to display "FALSE".

Thus, the CPU 11 shows the learner a process for determining whether the inequality which the learner has input holds, by producing a function concerned and using its first and second derivatives. Thus, the learner can efficiently learn proof of the inequality using a differentiating method to thereby achieve a high learning effect compared to the prior art.

[Seventh Embodiment]

Figure 17:
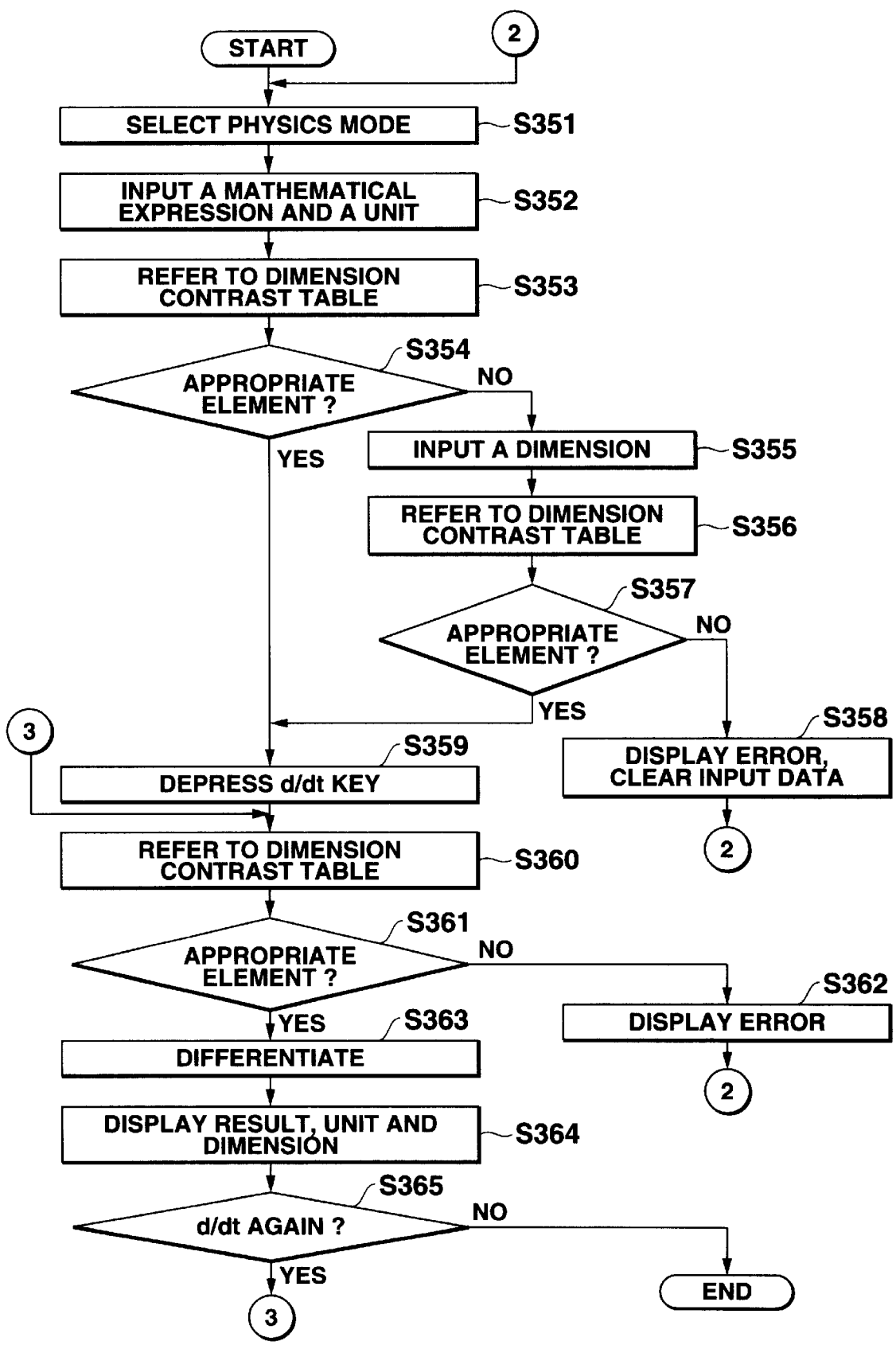
FIG. 17 is a flowchart of a physical calculating process performed by a computer as a seventh embodiment.

FIG. 17 is a flowchart of a physical calculating process performed by a computer 1 of the seventh embodiment. FIG. 18 schematically illustrates the composition of a dimension contrast table provided in the RAM 12.

FIG. 19 illustrates an example of a picture displayed on the display device 16 in the physical calculating process of FIG. 17. The seventh embodiment will be described next with reference to FIGS. 17–19.

In the computer 1 of the seventh embodiment, the elements of the computer 1 excluding the dimension contrast table (FIG. 18) provided in the RAM 12 are similar to corresponding ones of each of the first-sixth embodiments, and the same reference numeral is used to identify similar elements and further illustration and description thereof will be omitted.

In the computer 1, the dimension contrast table is stored in the RAM 12, as shown in FIG. 18. It contains units used in physical calculations, and names and dimensions of the units in corresponding relationship. The dimension is represented by M (mass), L (length) and T (time) which are the base units of physics. The units are for indicating physical quantities determined in International System of Units. Thus, by referring to the dimension contrast table of FIG. 18, the learner can easily know a dimension corresponding to an input unit.

Operation of the computer 1 will be then described. In the physical calculating process of FIG. 17, the learner first instructs the computer to select a physical mode which carries out physical calculations (step S351), and then inputs a mathematical expression and a unit indicative of a physical quantity to be calculated (step S352). The physical quantity in this case is not a fixed numerical value but a quantity expressed by a function of a predetermined variable.

The CPU 11 refers to the dimension contrast table stored in the RAM 12 for the unit inputted in step S352 (step S353). It determines whether an appropriate element indicative of the unit is set in the table (step S354). If so, the CPU 11 gets a dimension in correspondence to the unit in the table. If not in step S354, the CPU 11 requests the learner to input the dimension. If the dimension is input (step S355), the CPU 11 again refers to the table based on the input dimension, and determines whether the appropriate element is set (step S356).

When no appropriate element is set in the table either in this case, the CPU 11 determines that an inappropriate unit or dimension is input, causes the display device 16 to display an error massage, and then returns its control to step S351.

When the appropriate element is set in S357, the CPU 11 reads a corresponding unit from the table.

When the learner keys in an instruction to execute differentiation, for example, by depressing a d/dt key which instructs the computer to differentiate a function with respect to time (step S359), the CPU 11 refers to the dimension contrast table (18) in order to get a unit of a mathematical expression which will be obtained after the input mathematical expression is differentiated (step S360). The CPU 11 then determines whether an element indicative of the unit corresponding to the dimension of the differentiated expression is set on the table (step S361). If not, the CPU 11 causes the display device 16 to display an error message (step S362), and then returns its control to step S351.

When the appropriate element is set in the table in step S361, the CPU 11 differentiates the input mathematical expression (step S363), and causes the display device 16 to display a result of the differentiation, and a unit and a dimension used after the differentiation (step S364).

The CPU 11 requests the learner to input an instruction to determine whether the differentiated mathematical expression should be again differentiated (step S365). If the learner inputs the instruction to differentiate the expression again, the CPU 11 returns its control to step S360. If not, the CPU 11 terminates the processing.

FIGS. 19A and B show a picture of an input mathematical expression and a picture of a differentiated function, respectively, in the physical calculating process of FIG. 17.

As shown in FIG. 19A, when a mathematical expression is input by the leaner, a unit indicative of a physical quantity indicated by the expression is input. The CPU 11 refers to the table (FIG. 18) for the unit. If the unit is set in the table, the CPU 11 then gets the corresponding dimension and causes the display device 16 to display the dimension.

When the CPU 11 then differentiates the mathematical expression, refers to the table based on a dimension used after the differentiation, and then gets the corresponding unit, the CPU 11 causes the display device 16 to display the differentiated mathematical expression, and the corresponding dimension and unit.

In summary, according to the computer of the seventh embodiment, when the learner inputs a mathematical expression indicative of a physical quantity, and a unit of the physical quantity, the CPU 11 refers to the dimension contrast table based on the input unit and gets the corresponding dimension. The CPU 11 then differentiates the input expression, gets a dimension used after the differentiation based on the gotten dimension, refers to the table based on the dimension of the differentiated expression to get a unit of the differentiated expression, and causes the display device 16 to display the differentiated mathematical expression, its dimension and unit. Thus, the learner can learn application of a differentiating method in physics with a high learning effect. Since the CPU refers to the dimension contrast table based on the input unit to get the corresponding dimension, the CPU can easily determine a variable for the differentiation, and efficiently carries out the processing. Since the CPU refers to the dimension contrast table based on the dimension of the differentiated expression, the user can securely get even a unit related remotely to the differentiating process. The learner can handle units of little note, by setting them beforehand in the dimension contrast table, and can learn extensively.

[Eighth Embodiment]

Figure 20:
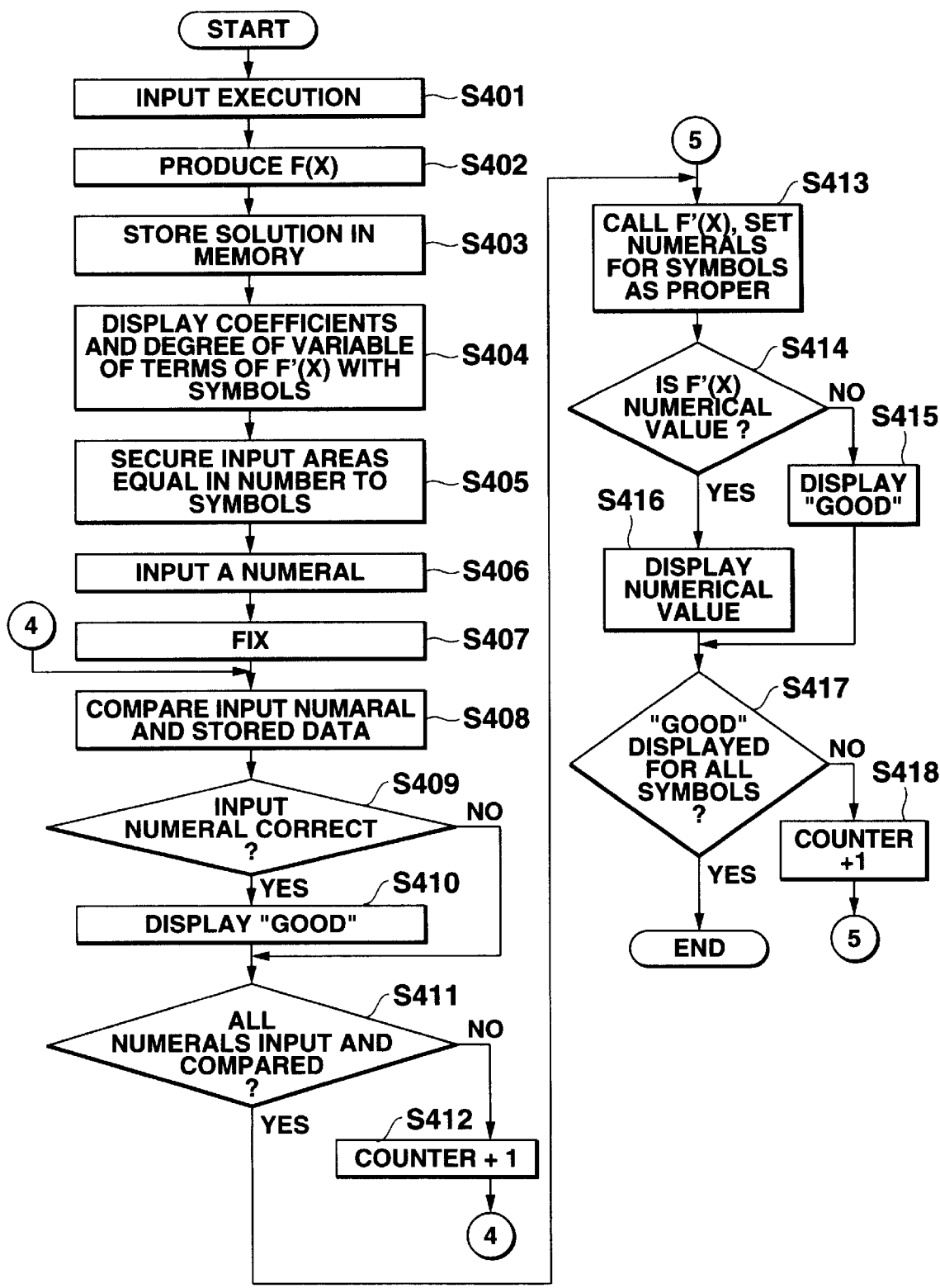
FIG. 20 is a flowchart of a derivative learning process performed by a computer as an eighth embodiment.

FIG. 20 is a flowchart of a derivative learning process performed by a computer as an eighth embodiment. FIGS. 21A, B and C show a picture on which a function is displayed, a picture on which an answer is input by the learner, and a picture on which "GOOD" is displayed, respectively, in the derivative learning process of FIG. 20.

The computer 1 of the eighth embodiment has a similar composition to that of the computer of the first embodiment. The same reference numeral is used to denote similar elements of those computers and further illustration and description thereof will be omitted.

When the learner keys in an instruction to perform a derived function learning process of FIG. 20 (step S401), the CPU 11 determines a function f(x) (step S402). In step S402, any one may be selected randomly from among a plurality of functions stored in the memory device 17 or a function f(x) may be produced by applying desired numerals and variables to present conditions such as the number of terms of the function and positiveness and negativeness of coefficients of the function.

Then, the CPU 11 stores in the RAM 12 a derivative f'(x) obtained by differentiating the determined function f(x) (step S403). The CPU 11 then represents coefficients of the respective terms of f'(x) and a degree of the variable x of each term with symbols, and causes the display device 16 to display a resulting expression whose places where numerals should primarily be displayed are displayed by symbols (step S404). In a subsequent series of processes, the learner is required to input numerals appropriate for the places of the expression displayed in step S404 where the symbols are displayed, for learning purposes.

After causing the display device 16 to display the expression containing the symbols, the CPU 11 causes the display device 16 to display input areas, in which the learner inputs data, equal in number to the symbols used in the expression displayed on the display device 16 (step S405).

When the learner inputs a numeral appropriate for a symbol (step S406), and fixes it (step S407), the CPU 11 compares the input numeral and the data stored in the RAM 12 in step S403 (step S408), and then determines whether the input numeral is correct or proper (step S409).

If so, the CPU 11 turns on a "GOOD" display flag (not shown) stored in the RAM 12 (step S410), and then shifts its control to step S411. When the CPU 11 determines NO in step S409, the CPU 11 directly shifts its control to step S411, where the CPU 11 determines whether numerals are input for all the symbols of the expression displayed on the display device 16 in step S404 and whether the input numerals are proper.

When the CPU 11 makes this determination first, it prepares a counter in the RAM 12 and increments a count in the counter (step S412). Each time the determination is made, the counter increments its count. In this way, when the count in the counter coincides with the number of symbols of the input mathematical expression, it is meant that numerals are input for all the symbols and proper. Thus, the CPU shifts its control to step S413, where the CPU 11 reads the derivative f'(x) stored in the RAM 12 in step S403, and sets the numerals appropriate for the symbols displayed on the display device 16 as being correct or proper.

The CPU 11 then determines whether the derivative f'(x) is a function or a numerical value (step S414). If the derivative function f'(x) is a fixed numerical value or when the variable has disappeared as a result of the differentiation of the function f(x), the CPU 11 causes the display device 16 to display the numerical value as the derivative function f'(x) (step S416).

If the derivative f'(x) is a function, the CPU 11 determines whether the GOOD flag stored in the RAM 12 is on. If so, the CPU 11 causes the display device 16 to display "GOOD" (step S415). If the GOOD flag is not on in step S415, the CPU 11 causes the display device 16 to display a correct numerical value instead of "GOOD".

Thereafter, the CPU 11 determines whether the display device has displayed "PROPER" or "GOOD" for all the symbols (step S417). When the CPU 11 has made this determination initially, it prepares a counter in the RAM 12, increments its count (step S418), returns its control to step S413 to determine whether a numeral for the next symbol is correct or GOOD, and causes the display device 16 to display the result of the determination. Then, the CPU 11 sequentially increments the count and repeats the similar steps, as a result of which the count in the counter coincides with the number of symbols, which means that the numerals for all the symbols are displayed as correct or GOOD. At this time, the CPU 11 terminates the series of steps.

FIGS. 21A, B and C show a picture on which a function is displayed, a picture on which an answer is input by the learner, and a picture on which "GOOD" is displayed, respectively, in the derivative learning process of FIG. 20.

In the picture of FIG. 21A, the function f(x) determined by the CPU 11 is displayed up in the picture, and the derivative f'(x) whose coefficients and the degree of the variable are expressed by symbols A, C and B is displayed down in the picture.

Displayed below the derivative f'(x) in the picture is an input area where numerical values appropriate for the symbols A, B and C are to be input. By inputting numerical values in the input area, the learner learns.

When the learner inputs numerical values, they are displayed in the input area of the picture of FIG. 21B. The CPU 11 determines whether the input numerical values are proper. As a result, as shown in FIG. 21C, the display device displays "GOOD" on the side of each of proper numerical values and a proper value on the side of an improper numerical value. In the picture of FIG. 21C, the display "GOOD" or "PROPER" is displayed in a highlighted state. In this way, the display device may emphatically display the result of the determination about the numerical value input by the learner.

In summary, according to the computer of the eighth embodiment, the CPU 11 determines a function f(x), obtains a derivative f'(x) by differentiating the function f(x), stores the derivative in the RAM 12, and causes the display device to display with the symbols the coefficient of the derivative and the degree of its variable. When the learner fixes the numerical values appropriate for the respective symbols by depressing the fix key, the CPU 11 determines whether those input numerical values are proper. If so, the CPU 11 causes the display device to display "GOOD", and if not, causes the display device to display a proper numerical value.

Therefore, the learner can easily learn calculation of a derivative without the necessity for handwork therefor and learn efficiently. The CPU 11 determines the function f(x). Thus, the computer becomes more convenient by storing many functions beforehand in the memory device 17.

If the computer of this embodiment has in the memory device 17 a learning history which contains the learner's learning dates, the number of questions which the learner answered, and the percentage of correct answers and if the CPU 11 determines a function f(x) in accordance with the learning history, the learner can have learning appropriate for his or her level of learning.

[Ninth Embodiment]

Figure 22:
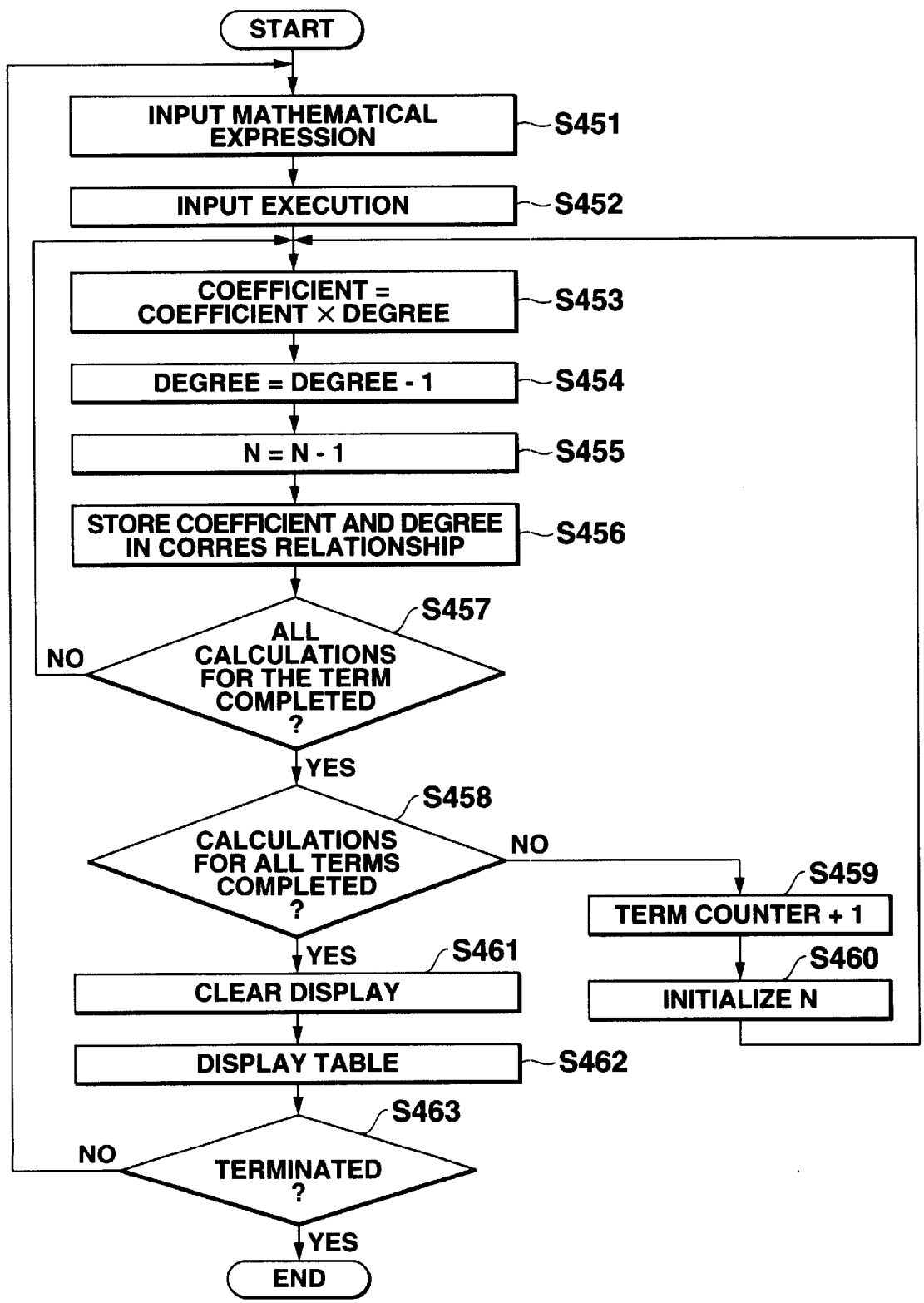
FIG. 22 is a flowchart of a coefficient learning process performed by a computer as a ninth embodiment.

FIG. 22 is a flowchart of a coefficient learning process performed by a computer 1 of the ninth embodiment. FIG. 23 illustrates a picture displayed on the display device 16 in the coefficient learning process of FIG. 22.

The computer 1 of this embodiment has a similar composition to the computer of the first embodiment, and the same reference numeral is used to identify similar elements of the computers and further illustration and description thereof will be omitted.

When the learner inputs a mathematical expression (step S451), and then keys in an instruction to process the mathematical expression (step S452), the CPU 11 sets a function f(x) represented by the input mathematical expression, and calculates coefficients of the respective terms of a high-order derivative obtained when the function f(x) is differentiated to that high order.

More particularly, first, before its processing, the CPU 11 determines a term of the function to be differentiated and sets the degree of a variable of the term as N. The CPU 11 then starts the processing, for example, from the head term of the mathematical expression, sets a term counter in the RAM 12, and sets the count at 1.

The CPU 11 calculates a new coefficient by multiplying the original coefficient of the term by the degree of the variable (step S453). Then, the CPU 11 subtracts one from the degree of the variable to provide a new degree (step S454). The CPU 11 further subtracts one from the degree N (step S455), and stores the values obtained in steps S453 and S454 in corresponding relationship in the RAM 12 (step S456).

The CPU 11 then determines whether the processing has been performed to the end about the term of interest (step S457). For example, if the term is x cubed, the CPU 11 has set N at 3 initially. Since the term of x cubed is differentiatable up to twice, a third or further differentiation necessarily brings the term to zero and differentiation is only required to be performed up to twice.

That is, the CPU 11 sets the degree of a term of interest at N, and subtracts one from N at each differentiation, and when N=1, determines that no more differentiation is possible.

Thus, in step S457, the CPU 11 determines whether N=1. If N is not less than 2, the CPU 11 returns its control to step S453, where it continues the processing. If N=1, the CPU 11 does not process the term of interest any longer and shifts its control to step S458, where the CPU 11 determines whether the processing on all the terms of the input mathematical expression has been terminated. If not, the CPU 11 increments the count in the term counter (step S459), determines the next term as one to be processed, sets a value of the degree N of a new term of interest (step S460), returns its control to step S453, where the CPU 11 sequentially obtains coefficients obtained by differentiating the respective terms of the input mathematical expression.

When the processing of all the terms of the input mathematical expression has been completed (step S457), the CPU 11 clears the picture displayed on the display device 16 (step S461), and causes the display device 16 to display in the form of a table the coefficients and degrees obtained, when the respective terms were differentiated, and stored in corresponding relationship in the RAM 12 (step S462).

Thereafter, the CPU 11 determines whether the processing should be performed again (step S463). If so, the CPU 11 returns its control to step S451 and if not, terminates the processing.

FIGS. 23A and B show a picture on which a mathematical expression is input and a picture on which a table of coefficients and degrees of the expression is displayed, respectively, in the coefficient learning process of FIG. 22.

The mathematical expression input by the user may be a polynomial, for example, "f(x)=x^8+5x^7" as shown in FIG. 23A or a single term one.

When the CPU 11 has performed the coefficient learning process on the respective terms of the input mathematical expression, it causes the display device 16 to display a table as shown in FIG. 23B. This table indicates in corresponding relationship coefficients and degrees obtained by repeatedly differentiating the respective terms "x^8" and "5x^7" of the input mathematical expression. For example, when the term "x^8" is differentiated twice, the resulting coefficient and degree are 56 and 6, respectively, as shown in a third record from above in the table. By the displayed table, the learner can efficiently learn by eliminating the necessity for taking the trouble to draw by hand a table of the coefficients obtained by the differentiation.

In summary, according to the computer 1 of the sixth embodiment, the CPU 11 causes the display device 16 to display a table of the respective coefficients of the terms and the respective degrees of the variable, arranged in corresponding relationship, of mathematical expressions obtained when differentiation is repeated on the input mathematical expression. Thus, the learner can effectively learn the relationship between differentiation and coefficients. Since the coefficients and degrees obtained by the differentiation are actually calculated by multiplying the coefficients and the corresponding degrees of the variable and by sequentially subtracting one from the respective degrees of the variable, a load on the computer is reduced to thereby achieve required calculation at high speeds.

[Tenth Embodiment]

Figure 25:
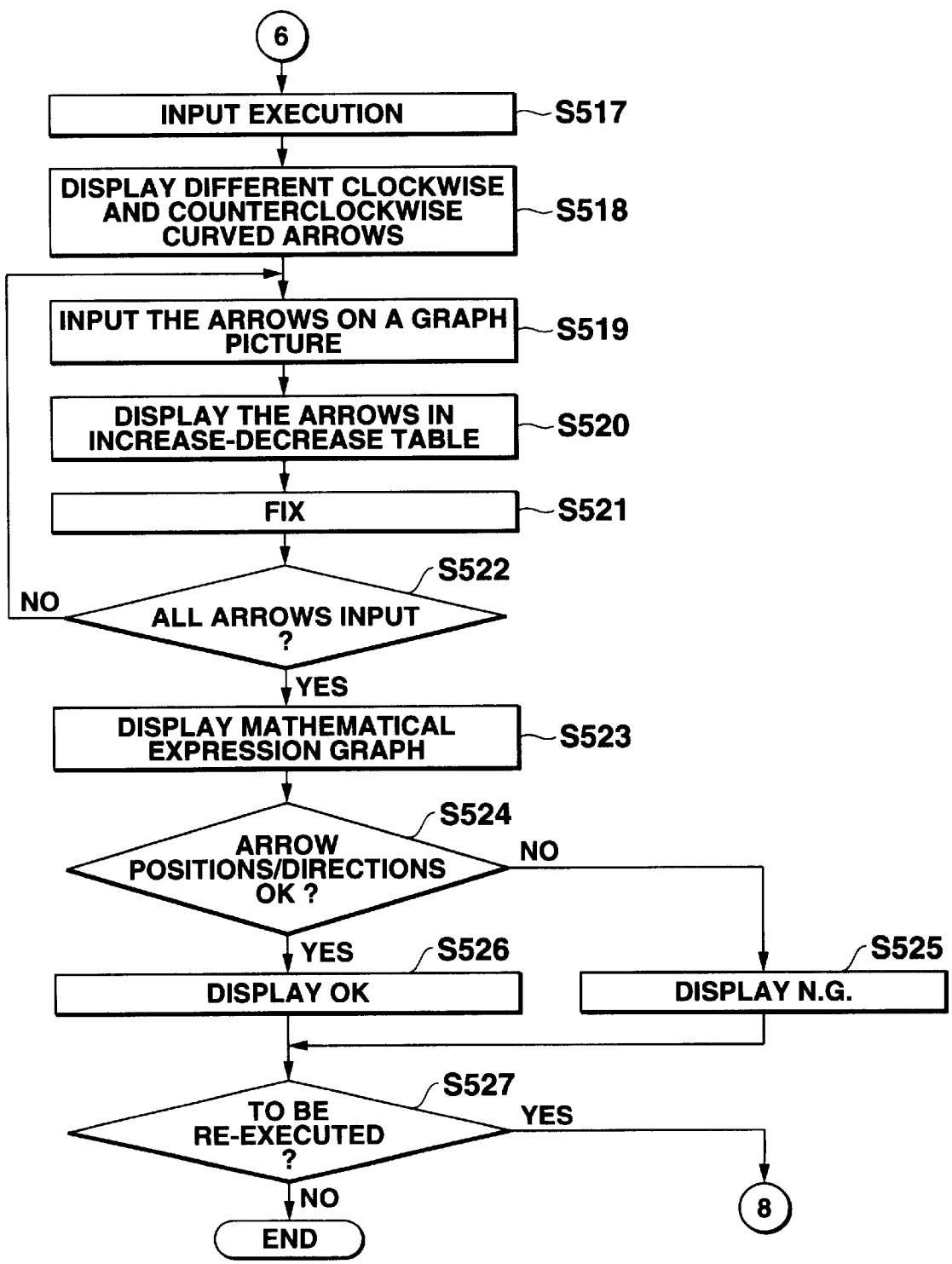
FIG. 25 is a flowchart continued to that of FIG. 24.
Figures 26A, 26B:
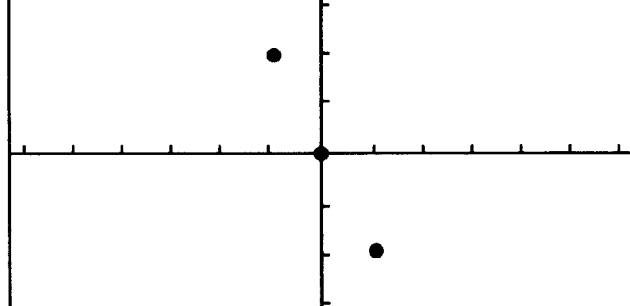
FIGS. 26A and B show a picture on which the increase-decrease table is displayed and a picture on which a plotted graph and the table are displayed, respectively, in the increase-decrease table application learning process of FIGS. 24 and 25.

FIGS. 24 and 25 are combined to indicate a flowchart of an increase-decrease table application learning process performed by a computer as a tenth embodiment. FIGS. 26A, B and FIGS. 27A, B illustrate pictures displayed on the display device 16 in the increase-decrease table application learning process of FIGS. 24 and 25.

The computer 1 of this embodiment has a similar composition to the computer of the first embodiment. Thus, the same reference numeral is used to identify similar elements of the computers of the tenth and first embodiments, and further illustration and description thereof will be omitted.

In an increase-decrease table application learning process of FIG. 24, the learner first inputs a mathematical expression (step S501). In step S501, the computer 1 may produce and set a mathematical expression therein, for example, by reading a mathematical expression stored beforehand in the memory device 17 in accordance with a key-in operation by the learner.

Then, the CPU 11 performs an increase-decrease table data creating process (FIG. 3) based on the set mathematical expression to produce increase-decrease table data to display a corresponding increase-decrease table (step S502). When the learner keys in an instruction to create the table (step S503), the CPU 11 causes the display device 16 to display the table based on the table data produced in step S502.

Then, when the learner inputs an instruction to perform processing on a graph (step S505), the CPU 11 clears the picture displayed on the display device 16 (step S506), and then causes the display device 16 to display a picture of the graph (step S507).

When the learner keys in an instruction to divide the picture (step S508), the CPU 11 again clears the picture displayed on the display device 16 (step S509), causes the display device 16 to display the graph in an upper half of the picture (step S510), and the table in a lower half of the picture (step S511).

When the learner inputs an instruction to continue the processing (step S512), the CPU 11 first causes the display device 16 to display in a highlighted state any one of cells of the table displayed in the lower half of the picture in which the x coordinates are displayed (step S513), and plots the function f(x) at that coordinate (step S514).

Then, the CPU 11 determines whether the f(x) has been plotted for all displayed x values (step S515). If not, the CPU 11 causes the display device to display the next cell of the table in a highlighted state (step S516), and then returns its control to step S514.

When the learner depresses the execution key after the plotting of the function has been completed in all the cells in which the x coordinates are displayed (step S517 of FIG. 25), the CPU 11 causes the display device 16 to simultaneously display usable clockwise-curved rightward and downward arrows and counterclockwise-rightward and upward arrows (step S518). Those keys are for inputting to the increase-decrease table those arrows indicative of a graphic shape of the function f(x) represented depending on whether a second derivative f''(x) is positive or negative. When the learner selects any arrow key (step S519), the CPU 11 causes the display device 16 to display the arrow in the displayed table and also in the graph display picture so as to corresponds to the table (step S520). When the learner inputs a fix instruction, the arrow is fixed (step S521).

The CPU 11 determines whether all the arrows have been input (step S522). If not, the CPU 11 returns its control to step S519. If so, the CPU 11 causes the display device 16 to display a graph of the mathematical expression set as the function f(x) (step S523).

Then, the CPU 11 determines whether the graph displayed in step S523 coincides with a curve drawn by the clockwise and counterclockwise curved arrows input by the learner (step S524). If not, the CPU 11 causes the display device 16 to display N.G. (step S525), and then shifts its control to step S527. If so in step S524, the CPU 11 causes the display device 16 to display OK (step S526) and then shifts its control to step S527, where the CPU 11 determines whether the increase-decrease table application learning process should be performed again. If so, the CPU 11 shifts its control to step S501 (FIG. 24), and if not, terminates the processing.

Figure 27A:
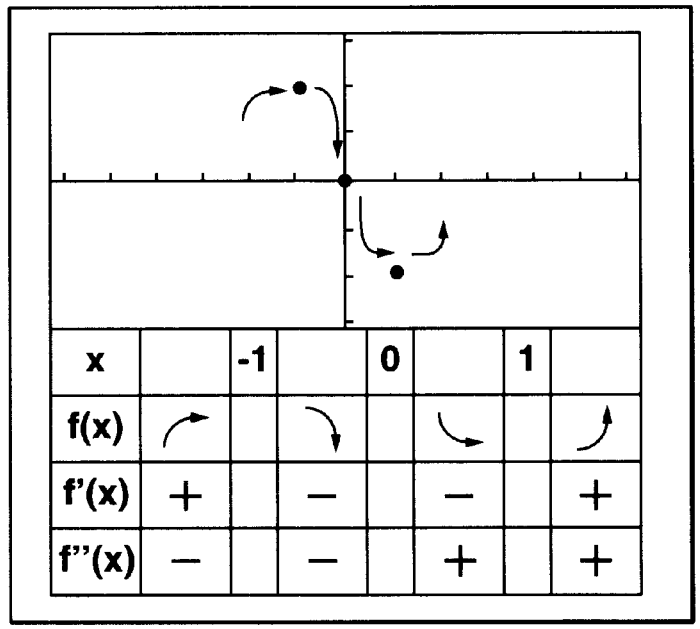
FIGS. 27A and B show a picture on which different curved arrows having clockwise and counterclockwise rising and falling directions are displayed and a picture on which a graph of a function f(x) is displayed, respectively, in the increase-decrease table application learning process of FIGS. 24 and 25.

FIGS. 26A and B show a picture on which the increase-decrease table is displayed and a picture on which a plotted graph and the table are displayed, respectively, in the increase-decrease table application learning process of FIGS. 24 and 25. FIGS. 27A and B show a picture on which clockwise-curved rightward and downward arrows and counterclockwise-counterclockwise curved arrows indicative of changes in the graph, the CPU 11 causes the display device 16 to display those arrows and the graph of the function f(x), and then determines whether the curve drawn by the clockwise and counter clockwise arrows input by the learner coincide with the graph. If so, the CPU 11 causes the display device 16 to display OK, and if not, N.G. Thus, the learner can learn presuming a change in the graph of the function f(x) based on the values of the first and second derivatives f'(x) and f''(x) on the table without the necessity for creating the table by himself or herself and drawing the graph by hand. Especially, when the function f(x) has a complex form, a work for drawing the graph is troublesome in the prior art. However, according to the tenth embodiment, since the CPU 11 creates the increase-decrease table of the function f(x), and displays a graph of the function, the learner's load is reduced in learning and the learner can learn efficiently. Since the learner's load is reduced, the learner can easily handle even a complex function which is difficult to handle in a limited time in the past.

While the particular embodiment is illustrated as calculating a first and a second derivative, the present invention is not limited to this case, but an increase-decrease table for a quadratic function is processed depending on a range of learning. In this case, processing for a second derivative is not required. The arrangement may be such that an increase-decrease table for a function of higher order such as a quartic function is handled.

While in each of the second-fifth and ninth embodiments a function handled in the graph display process is illustrated as being input by the learner, the present invention is not limited to this particular case. For example, an arrangement may be such that the learner selects any one curved rightward and upward arrows are displayed and a picture on which a graph of a function f(x) is displayed, respectively, in the increase-decrease table application learning process of FIGS. 24 and 25.

The picture of FIG. 26A displays the set function f(x) and its increase-decrease table. The learner confirms substantially the shape of the graph based on the table.

The picture of FIG. 26B is divided into upper and lower halves which display the graph and the table, respectively. The graphic representation displayed in the upper half of the picture plots x coordinates, that is, "−1", "0" and "1" displayed on the table displayed in the lower half of the picture.

When the learner inputs the four clockwise-curved rightward and downward arrows and counterclockwise-curved rightward and upward arrows indicative of changes in the f(x) to the increase-decrease table based on the points plotted on the picture and positive and negative signs of the values of the first and second derivatives f'(x) and f''(x) of the table, the display device displays a picture of FIG. 27A which contains the clockwise and counter clockwise arrows in the table and graphic picture.

Figure 27B:
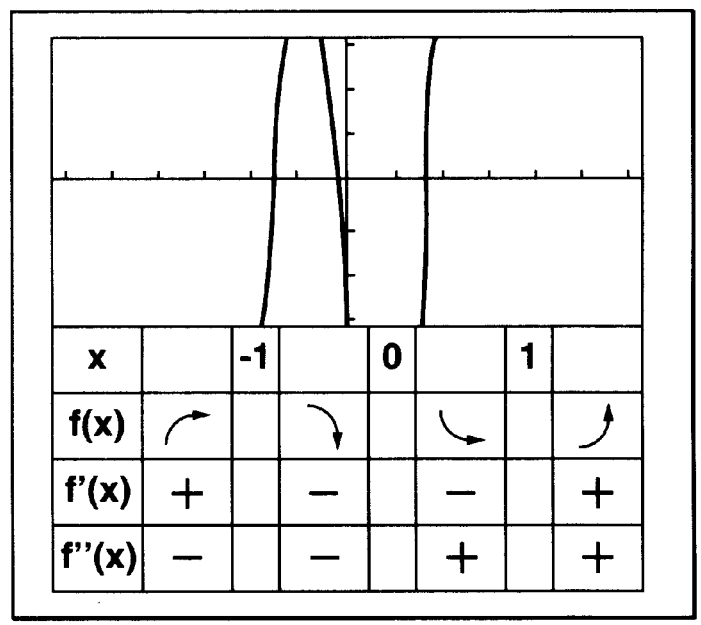

When the learner completes the inputting operation, the display device displays a picture of FIG. 27B which has a graph of the function f(x). The CPU 11 then determines whether the graph coincides with a curve drawn by the clockwise-curved rightward and downward arrows and counterclockwise-curved rightward and upward arrows input by the learner.

In summary, according to the computer of the tenth embodiment, the CPU 11 creates an increase-decrease table for the function f(x) and causes the display device 16 to display the table, and the graph display picture. When the learner inputs to the table the different clockwise and from a plurality of mathematical expressions stored in the ROM 13, memory device 17 or recording medium 18 to thereby set a corresponding function.

What is claimed is:

1. An electronic apparatus comprising;
   function setting means for setting a function;
   first-order differentiating means for differentiating the function set by the function setting means to provide a first-derivative;
   increase-decrease table data producing means for producing increase-decrease table data for displaying an increase-decrease table which contains an increase-decrease state of the function set by the function setting means, and positive and negative signs of values of the first-derivative function obtained by the first-order differentiating means, in predetermined domains; and
   displaying means for displaying the increase-decrease table on the basis of the increase-decrease table data produced by the increase-decrease table data producing means.

2. The electronic apparatus according to claim 1, further comprising second-order differentiating means for obtaining a second derivative of the function by further differentiating the first-derivative provided by the first-derivative differentiating means, and wherein:
   the increase-decrease table data producing means produces the increase-decrease table data for displaying the increase-decrease table which contains in the predetermined domains the increase-decrease state of the function set by the function setting means, positive and negative signs of values of the first-derivative obtained by the first-order differentiating means, and positive and negative signs of values of the second derivative obtained by the second-order differentiating means.

3. The electronic apparatus according to claim 2, wherein the increase-decrease table data producing means produces the decrease-decrease table data for displaying the increase-decrease table which represents the increase-decrease state of the function set by the function setting means, in two kinds of increase states and two kinds of decrease states in the predetermined domains, on the basis of the positive and negative signs of values of the first and second derivatives in the predetermined domains.

4. The electronic apparatus according to claim 1, further comprising:
   display controlling means for controlling the displaying means to displaying the increase-decrease table in a state where a portion of the increase-decrease table data is hidden, when the increase-decrease table is displayed by the displaying means on the basis of the increase-decrease table data produced by the increase-decrease table data producing means,
   increase-decrease table data inputting means for inputting data to the hidden data portion of the increase-decrease table displayed by the displaying means under control of the display controlling means; and
   increase-decrease table data determining means for determining whether the data inputted by the increase-decrease table data inputting means coincides with the hidden data portion of the increase-decrease table data produced by the increase-decrease table data producing means or not to output a result of the determination.

5. The electronic apparatus according to claim 1, further comprising graphic data producing means for producing graphic data for displaying a graph of the function set by the function setting means on the basis of the increase-decrease table data produced by the increase-decrease table data producing means, and wherein the displaying means displays the graph in a predetermined display form on the basis of the graphic data produced by the graphic data producing means.

6. The electronic apparatus according to claim 5, wherein the displaying means displays the increase-decrease table and the graph simultaneously on the basis of the increase-decrease table data produced by the increase-decrease table data producing means and the graphic data produced by the graphic data producing means, and further comprising:
   graph position specifying means for specifying a particular position on the graph displayed by the displaying means;
   domain detecting means for detecting a domain corresponding to the position designated by the graph position designating means; and
   emphatic display controlling means for controlling the displaying means to emphatically display a portion of the increase-decrease table displayed by the displaying means corresponding to the domain detected by the domain detecting means.

7. The electronic apparatus according to claim 5, further comprising:
   higher-order differentiating means for obtaining a higher-order derivative by differentiating the second derivative obtained by the second-order differentiating means a required numbers of times, and for sequentially outputting the higher-order derivative obtained by the respective differentiating means; and
   graphic display controlling means for controlling the displaying means to display graphs of the first derivative obtained by the first-order differentiating means, the second derivative obtained by the second-order differentiating means, and the higher-order derivatives obtained sequentially by the higher-order differentiating means.

8. An electronic apparatus comprising:
   function setting means for setting a plurality of functions;
   supposing means for setting domains for the plurality of functions set by the function setting means and for supposing the relationship in magnitude between the plurality of functions in the domain;
   function producing means for producing a new function representing a difference between the plurality of functions in accordance with the relationship in magnitude between the plurality of functions supposed by the supposing means;
   differentiating means for differentiating the new function produced by function producing means to provide a first derivative and for differentiating the first derivative to obtain a second derivative;
   increase-decrease table data producing means for producing increase-decrease table data which displays an increase-decrease table which contains the positive and negative signs of values of the first and second derivatives in the domain set by the supposing means, and the increase-decrease state of the new function;
   determining means for determining whether or not the relationship in magnitude between the plurality of functions supposed by the supposing means is correct by referring to the increase-decrease state of the new function, in the increase-decrease table data produced by the increase-decrease table data producing means, on the basis of the increase-decrease state of the new function; and displaying means for displaying the increase-decrease table on the basis of the increase-decrease table data produced by the increase-decrease table data producing means, and for displaying a result of the determination by the determining means.

9. A storage medium which contains a computer executable program comprising:

a program code for setting a function;

a program code for differentiating the function to obtain a first-derivative;

a program code for producing increase-decrease table data to display an increase-decrease table which contains an increase-decrease state of the function, and positive and negative signs of values of the first-derivative, in predetermined domains; and a program code for causing displaying means to display the increase-decrease table on the basis of the increase-decrease table data.

10. A storage medium which contains a computer executable program comprising:

a program code for setting a plurality of functions;

a program code for setting domains of the plurality of functions and for supposing the relationship in magnitude between the plurality of functions in the domains;

a program code for producing a new function representing a difference between the plurality of functions in accordance with the supposed relationship in magnitude;

a program code for differentiating the new function to obtain a first derivative and for further differentiating the first derivative to obtain a second derivative;

a program code for producing increase-decrease table data for displaying an increase-decrease table which contains positiveness and negativeness of values of the first and second derivatives, and the increase-decrease state of the new function, in the set domains;

a program code for determining whether or not the relationship in magnitude between the plurality of functions is correct, by referencing the increase-decrease state of the new function in the increase-decrease table data; and a program code for displaying the increase-decrease table on the basis of the increase-decrease table data, and a result of the determination by the determining means.

\* \* \* \* \*